US012209599B1

(12) United States Patent
Park et al.

(10) Patent No.: US 12,209,599 B1
(45) Date of Patent: Jan. 28, 2025

(54) MULTI-STAGE ACTUATOR FOR A TURBOCHARGER

(71) Applicant: Savant Holdings LLC, South Jordan, UT (US)

(72) Inventors: Bret J. Park, South Jordan, UT (US); Taylor J. Summers, South Jordan, UT (US); Zackary D. Swasey, Riverton, UT (US)

(73) Assignee: Savant Holdings LLC, South Jordan, UT (US)

( * ) Notice: Subject to any disclaimer, the term of this patent is extended or adjusted under 35 U.S.C. 154(b) by 0 days.

(21) Appl. No.: 18/125,010

(22) Filed: Mar. 22, 2023

(51) Int. Cl.
*F15B 15/10* (2006.01)
*F01D 17/16* (2006.01)
*F15B 11/08* (2006.01)

(52) U.S. Cl.
CPC ............ *F15B 15/10* (2013.01); *F01D 17/165* (2013.01); *F15B 11/08* (2013.01); *F05D 2220/40* (2013.01)

(58) Field of Classification Search
CPC ................................ F15B 15/10; F15B 15/226
See application file for complete search history.

(56) References Cited

U.S. PATENT DOCUMENTS 3,028,842 A * 4/1962 Dobrikin ............... B60T 17/085 188/170
3,153,988 A * 10/1964 Warstler .................. F15B 15/04 92/99
4,125,060 A * 11/1978 McGee ................... F16K 41/18 92/128
4,256,019 A * 3/1981 Braddick .............. F02B 37/186 60/602
4,285,200 A 8/1981 Byrne et al.
4,322,949 A 4/1982 Byrne et al.
4,408,627 A * 10/1983 Harris ....................... F02D 9/06 251/63.4

(Continued)

FOREIGN PATENT DOCUMENTS

CN 107869386 B 11/2021
EP 1418311 A1 5/2004

(Continued)

OTHER PUBLICATIONS

Arnold, Robert Lucky; 'Wastegate Adjustment, A Closer look' In Matthew's Volvo Site forum [online] apparently published on Nov. 30, 2012, retrieved from the Internet on Jul. 21, 2023, from <URL: https://www.matthewsvolvosite.com/forums/viewtopic.php?t=53189> (shown in attachment 1).

(Continued)

*Primary Examiner* — Thomas E Lazo
(74) *Attorney, Agent, or Firm* — Austin Rapp

(57) ABSTRACT

A multi-stage actuator for a turbocharger is disclosed. The actuator may comprise a diaphragm having an axially movable portion. An actuating shaft is coupled to the axially movable portion such that axial movement of the axially movable portion causes axial movement of the actuating shaft. Only a first spring resists axial movement of the axially movable portion within a first range of axial positions of the axially movable portion, and both a first and a second spring resist axial movement of the axially movable portion within a second range of axial positions of the axially movable portion.

20 Claims, 33 Drawing Sheets

(56) References Cited

U.S. PATENT DOCUMENTS

| | | | | |
|---|---|---|---|---|
| 4,478,043 | A | 10/1984 | Kobavashi et al. | |
| 4,622,817 | A | 11/1986 | Kobayashi | |
| 4,643,640 | A | 2/1987 | Burdette et al. | |
| 4,659,295 | A | 4/1987 | Burdette et al. | |
| 4,995,305 | A * | 2/1991 | Garrigues | F15B 15/066 92/138 |
| 5,024,490 | A * | 6/1991 | Wang | B60T 13/261 92/130 A |
| 5,231,831 | A * | 8/1993 | Leavesley | F02B 37/24 415/157 |
| 5,392,807 | A * | 2/1995 | Caudle | F16K 31/1221 92/128 |
| 5,746,058 | A * | 5/1998 | Vertanen | F15B 15/10 248/299.1 |
| 6,269,642 | B1 | 8/2001 | Arnold | |
| 7,255,530 | B2 | 8/2007 | Vogiatzis et al. | |
| 8,166,755 | B2 * | 5/2012 | Jeanson | F02D 23/02 92/92 |
| 8,985,943 | B2 | 3/2015 | Groves et al. | |
| 9,017,017 | B2 | 4/2015 | Sausse et al. | |
| 9,429,033 | B2 | 8/2016 | Martin et al. | |
| 10,077,710 | B2 | 9/2018 | Alcaraz | |
| 10,294,856 | B2 | 5/2019 | Lotz | |
| 10,927,702 | B1 | 2/2021 | Park | |
| 2011/0262266 | A1 * | 10/2011 | Rakoci | F02B 37/24 415/118 |
| 2013/0232970 | A1 | 9/2013 | Mavir et al. | |
| 2015/0322849 | A1 | 11/2015 | Ward | |
| 2017/0009785 | A1 * | 1/2017 | McEvoy | F16K 31/1268 |
| 2018/0058247 | A1 | 3/2018 | Karamavruc et al. | |

FOREIGN PATENT DOCUMENTS

| | | | | |
|---|---|---|---|---|
| WO | 2008118833 | A1 | 10/2008 | |
| WO | WO-2015020846 | A1 * | 2/2015 | F02B 37/186 |
| WO | 2019105080 | A1 | 6/2019 | |

OTHER PUBLICATIONS

Shadzi, Javad; 'An explanation of wastegate function, bigger isn't always bigger.' In VWvortex forum [online] apparently published on Feb. 11, 2008, retrieved from the Internet on Jul. 27, 2023, from <URL: https://www.vwvortex.com/threads/tech-articles-by-034-motorsport.3680720/> (shown in pp. 9-13 of attachment 2).

Flow Control Technology Valve, Multi Spring Actuators; General Features, Web page, apparently published on or before Oct. 23, 2020, retrieved from the Internet Archive on Jul. 21, 2023, from <URL: https://web.archive.org/web/20201023234152/https://www.fctvalve.com/pneumatic-diaphragm-actuators/multi-spring-actuators> (shown in attachment 3).

* cited by examiner

MULTI-STAGE ACTUATOR FOR A TURBOCHARGER

TECHNICAL FIELD

The present invention relates to actuators for turbochargers and, more particularly, to a multi-stage actuator for a turbocharger.

BACKGROUND

While turbochargers have been available for some time, improvements are still desirable. For example, an actuator controls how much of the exhaust gas contacts the turbine wheel. Altering how the actuator operates can improve the longevity, efficiency and operation of a turbocharger and is therefore desirable.

SUMMARY

Embodiments of the disclosed subject matter are provided below for illustrative purposes and are in no way limiting of the claimed subject matter.

A first embodiment of an actuator for a turbocharger is disclosed. The first embodiment of the actuator may comprise: an actuator body defining an inner chamber, the actuator body may comprise an axial dimension, a width dimension, a first casing and a second casing; a diaphragm may comprise an axially movable portion and a peripheral portion, the peripheral portion being secured between the first casing and the second casing, the diaphragm dividing the inner chamber into a first chamber and a second chamber; and an actuating shaft coupled to the axially movable portion such that axial movement of the axially movable portion causes axial movement of the actuating shaft; an inlet in fluid communication with the first chamber; a first spring and a second spring disposed within the second chamber, wherein the first spring may be positioned within the second chamber such that only the first spring engages with and resists movement of the axially movable portion within a first range of axial positions of the axially movable portion, and wherein the second spring may be positioned within the second chamber such that both the first spring and the second spring engage with and resist movement of the axially movable portion within a second range of axial positions of the axially movable portion.

The first embodiment of the actuator may further comprise a third spring positioned within the second chamber, wherein the third spring may be positioned within the second chamber such that each of the first spring, the second spring, and the third spring engage with and resist movement of the axially movable portion within a third range of axial positions of the axially movable portion.

The first embodiment of the actuator may further comprise a first spring remote ledge for limiting axial movement of a remote end of the first spring in an axial direction away from the first chamber, a second spring remote ledge for limiting axial movement of a remote end of the second spring in the axial direction away from the first chamber, and a third spring remote ledge for limiting axial movement of a remote end of the third spring in the axial direction away from the first chamber, wherein an axial position of the first spring remote ledge may be different than an axial position of the second spring remote ledge and an axial position of the third spring remote ledge, and wherein the axial position of the second spring remote ledge may be different than the axial position of the third spring remote ledge.

Within the first embodiment of the actuator, a resting axial length of the first spring may be different than a resting axial length of the second spring and a resting axial length of the third spring, and the resting axial length of the second spring may be different than the resting axial length of the third spring.

Within a first embodiment of the actuator, at least a portion of the third spring may be disposed radially inward of at least a portion of the first spring and at least a portion of the second spring, and wherein at least a portion of the second spring may be disposed radially inward of at least a portion of the first spring.

The first embodiment of the actuator may further comprise linkage coupled to the actuating shaft, and wherein an axial position of the linkage relative to the actuating shaft may be adjustable.

Within the first embodiment of the actuator, an axial position of the axial movable portion may be altered in response to changes in fluid pressure within the first chamber.

Within the first embodiment of the actuator, wherein the first, second, and third springs may cause decreased movement of the actuating shaft in the axial direction away from the first chamber in response to at least one fluid pressure level within the first chamber when compared to movement of the actuating shaft in the axial direction away from the first chamber in response to the at least one fluid pressure level in the first chamber if the actuator were devoid of the second and third springs.

Within the first embodiment of the actuator, each of the first, second and third springs are helical, compression springs.

The first embodiment of the actuator may further comprise a stopper sleeve disposed around the actuating shaft to limit axial movement of the actuating shaft in the axial direction away from the first chamber, the stopper sleeve being disposed within the second chamber.

The first embodiment of the actuator may further comprise linkage coupled to the actuating shaft, wherein the linkage is pivotally coupled to an actuating arm, and wherein the actuating arm is coupled to a unison crank such that axial movement of the actuating shaft and the linkage causes rotational movement of the unison crank; further comprising an annular unison ring and a plurality of vane assemblies, wherein the unison crank may be pivotally coupled to the annular unison ring such that rotation of the unison crank causes rotational movement of the annular unison ring, and wherein the annular unison ring may be coupled to the plurality of vane assemblies such that the rotational movement of the annular unison ring causes rotation of each of the plurality of vane assemblies.

A second embodiment of an actuator for turbochargers is disclosed. The second embodiment of the actuator may comprise: an actuator body defining an inner chamber, the actuator body may comprise an axial dimension, a width dimension, a first casing and a second casing; a diaphragm may comprise an axially movable portion and a peripheral portion, the peripheral portion being secured between the first casing and the second casing, the diaphragm dividing the inner chamber into a first chamber and a second chamber; an actuating shaft coupled to the axially movable portion such that axial movement of the axially movable portion causes axial movement of the actuating shaft, the actuating shaft being slidably positioned within an opening in the actuator body; and an inlet in fluid communication with the first chamber; a first spring and a second spring disposed within the second chamber, wherein the first spring may be positioned within the second chamber such that only the first spring engages with and resists movement of the axially movable portion within a first range of axial positions of the axially movable portion, and wherein the second spring may be positioned within the second chamber such that both the first spring and the second spring engage with and resist movement of the axially movable portion within a second range of axial positions of the axially movable portion.

The second embodiment of the actuator further comprising a third spring positioned within the second chamber, wherein the third spring may be positioned within the second chamber such that each of the first spring, the second spring, and the third spring engage with and resist movement of the axially movable portion within a third range of axial positions of the axially movable portion.

The second embodiment of the actuator further comprising a first spring remote ledge for limiting axial movement of a remote end of the first spring in an axial direction away from the first chamber, a second spring remote ledge for limiting axial movement of a remote end of the second spring in the axial direction away from the first chamber, and a third spring remote ledge for limiting axial movement of a remote end of the third spring in the axial direction away from the first chamber, wherein an axial position of the first spring remote ledge may be different than an axial position of the second spring remote ledge and an axial position of the third spring remote ledge, and wherein the axial position of the second spring remote ledge may be different than the axial position of the third spring remote ledge.

Within a second embodiment of the actuator, a resting axial length of the first spring may be different than a resting axial length of the second spring and a resting axial length of the third spring, and the resting axial length of the second spring may be different than the resting axial length of the third spring.

Within a second embodiment of the actuator, at least a portion of the third spring may be disposed radially inward of at least a portion of the first spring and at least a portion of the second spring, and at least a portion of the second spring may be disposed radially inward of at least a portion of the first spring.

The second embodiment of the actuator further comprising linkage coupled to the actuating shaft, and wherein an axial position of the linkage relative to the actuating shaft may be adjustable.

Within a second embodiment of the actuator, an axial position of the axial movable portion may be altered in response to changes in fluid pressure within the first chamber.

Within a second embodiment of the actuator, the first, second, and third springs decrease axial movement of the actuating shaft in the axial direction away from the first chamber in response to at least one fluid pressure level within the first chamber when compared to axial movement of the actuating shaft in the axial direction away from the first chamber in response to the at least one fluid pressure level in the first chamber if the actuator were devoid of the second and third springs.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 21 illustrates a 2-spring actuator rather than a 3-spring actuator)

Figure 1:
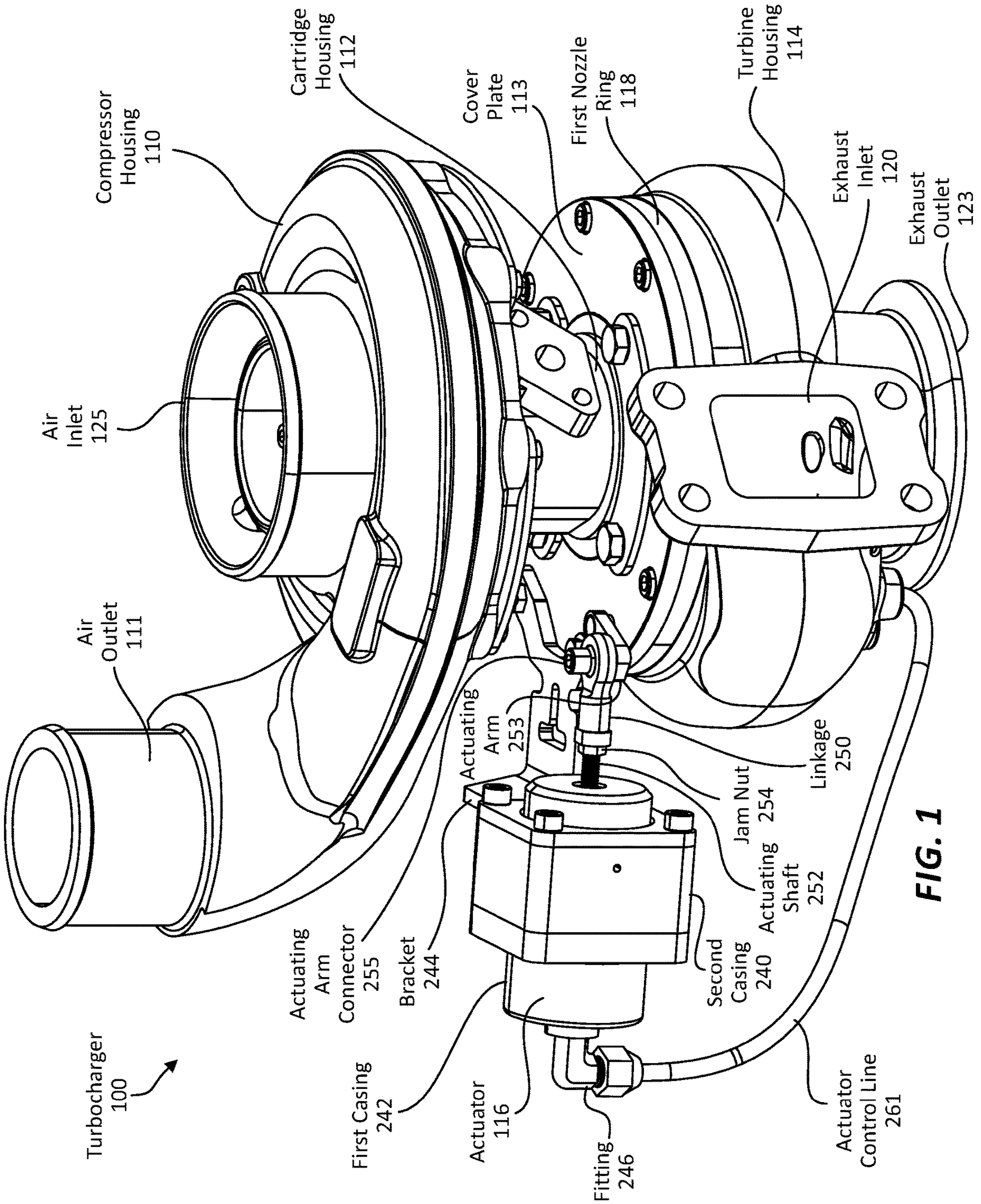
FIG. 1 is a perspective view of one embodiment of a multi-stage actuator coupled to a turbocharger.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms that may be used in this application. Additional definitions may be provided in the context of the discussion of the figures herein. As used herein, "exemplary" can indicate an example, an implementation, and/or an aspect of the disclosed subject matter and does not signify a preferred implementation.

Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") when used to modify an element (such as a structure, a component, an operation, etc.) does not indicate priority or order of the element with respect to another element, but rather distinguishes the element from another element having a same name (but for use of the ordinal term) unless otherwise expressly indicated.

In addition, as used herein, indefinite articles ("a" and "an") can indicate "one or more" rather than "one."

As used herein, a structure or operation that "comprises" or "includes" or "has" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited.

As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter.

An enumerated listing of items recited in connection with an embodiment of the invention does not imply that any or all of the items are mutually exclusive and/or mutually inclusive of one another unless expressly specified otherwise.

The phrases "coupled to" and "secured to" refer to any form of direct or indirect mechanical connection between two items, including connections that use intermediary items or connectors, such as bolts or screws. The phrase "pivotally coupled to" refers to forms of mechanical coupling that permits the two coupled items to pivot with respect to one another. The phrase "slidably coupled to" refers to forms of mechanical coupling that permits the two coupled items to slide with respect to one another. The phrase "fixedly coupled to" refers to forms of mechanical coupling such that movement, rotation, or pivoting of one of the coupled items results in a corresponding movement of the other coupled item(s). The phrase "secured between" refers to a specified item being fixedly disposed between two other items. The phrase "slidably positioned within" signifies that a first specified item may slide with respect to a specified second item.

The phrase "coupled directly to" refers to a form of attachment or coupling by which the coupled items are either in direct contact, or are only separated by a single fastener, adhesive, or other attachment or coupling mechanism. The term "abut" refers to items that are in direct physical contact with each other, although the items may be coupled, attached, secured, fused, or welded together.

The term "integrally formed" refers to a body that is manufactured integrally, i.e., as a single piece, without requiring the assembly of multiple pieces. Multiple parts may be integrally formed with each other if they are formed from a single workpiece. The term "non-integrally formed" signifies that two identified items are separately manufactured (e.g., either by different manufacturing processes, by the same manufacturing process at different times and/or locations).

As used herein, the term "substantially coaxially aligned" signifies that two items are aligned such that the items share a common, imaginary axis (or are within 15° of sharing the same common, imaginary axis) extending through both of the items, although the items may be spaced apart along that common, imaginary axis.

In various embodiments, the term "offset and substantially coaxially aligned" signifies that two items are aligned such that they share a common, imaginary axis (or are within 15° of sharing the same common, imaginary axis) extending through both of the items and the center points of the items along the common, imaginary axis and are spaced apart along the common, imaginary axis.

In various embodiments, "overlapping and substantially coaxially aligned" signifies that two items are aligned such that they share a common, imaginary axis (or are within 15° of sharing the same common, imaginary axis) extending through both of the items and the items overlap along the common, imaginary axis.

In various embodiments, "coextensive and substantially coaxially aligned" signifies that two items are aligned such that they share a common, imaginary axis (or are within 15° of sharing the same common, imaginary axis) extending through both of the items and the items are coextensive along the common, imaginary axis.

As used herein, the term "generally" indicates that a particular item is within 15° of a specified orientation or value. As used herein, the term "substantially" indicates that a particular value is within 15% of a specified value. For example, the phrase "substantially parallel," as used herein, signifies that the pertinent members, components, or items that are "substantially parallel" to each other are within 15° of being perfectly parallel to each other.

As used herein, in various embodiments, the term "center point nonalignment" when used to identify a relative position of items, features or components along a designated axis signifies that the center points of each of the two identified items are not aligned along a designated axis. In various embodiments, the term "outer boundary nonalignment" may be used to signify that the outer boundaries of two items do not overlap along a designated axis. The term "nonaligned positions" indicates that two items are not aligned along at least one axis and may refer, for example, to either center point nonalignment or outer boundary nonalignment.

In the figures, certain components may appear many times within a particular drawing. However, only certain instances of the components may be identified in the figures to avoid undue proliferation of reference numbers and lead lines. According to the context provided in the description while referring to the figures, reference may be made to a specific one of that particular component or multiple instances, even if the specifically referenced instance or instances of the component are not identified by a reference number and lead line in the figures.

In addition, the following description, the figures may be discussed in groups of two or more figures. Within each group, each reference number included in the description will appear within at least one figure within the group, but not necessarily in all of the figures, again, to avoid the undue proliferation of reference numbers within the figures.

FIGS. 1-2

Figure 2:
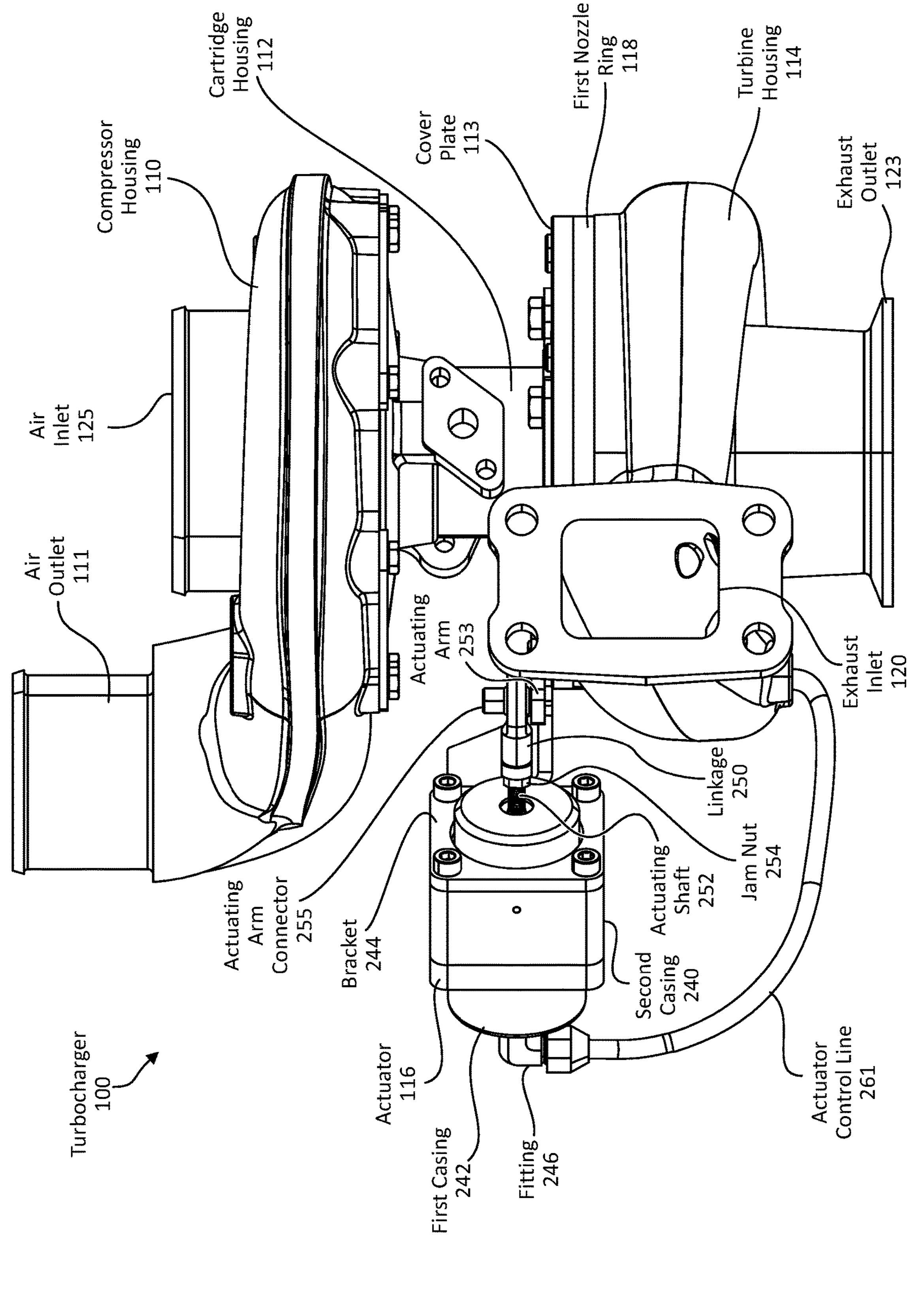
FIG. 2 is a side, elevational view of the embodiment of the multi-stage actuator coupled to the turbocharger shown in FIG. 1.

FIG. 1 is a perspective view of one embodiment of a turbocharger 100, while FIG. 2 is a side, elevational view of the embodiment of the turbocharger 100 shown in FIG. 1. FIGS. 1-2 will be discussed collectively. The turbocharger 100 may comprise a compressor housing 110 having an air inlet 125, an air outlet 111, a cartridge housing 112, a cover plate 113, a turbine housing 114 having an exhaust inlet 120, an exhaust outlet 123, a first nozzle ring 118, and an actuator 116.

Speaking broadly, the turbocharger 100 may be utilized, for example, to receive exhaust from an engine through the exhaust inlet 120 of the turbine housing 114 (with the exhaust exiting the turbine housing 114 through the exhaust outlet 123) and then provide pressurized fluid (e.g., exhaust and/or air) from the compressor housing 110 via the air outlet 111 to an intake manifold of the engine to increase the power output of the engine. The air enters the compressor housing 110 via the air inlet 125. As used herein, the term "exhaust" refers to air and/or particulate matter generated by operation of a combustion engine.

The cartridge housing 112 may be used to secure the compressor housing 110 to the turbine housing 114. Fasteners 117 may be used to secure the cover plate 113 and first nozzle ring 118 to the turbine housing 114.

The actuator 116 may be employed to control a set of vane assemblies (illustrated and discussed subsequently) that regulate exhaust flow through the turbine housing 114.

As illustrated, the actuator 116 may comprise a first casing 242 and a second casing 240. The actuator 116 may be secured to a cover plate 113 using a bracket 244. Exhaust from the turbine housing 114 enters the actuator 116 by an actuator control line and a fitting 246. An actuating shaft 252 is moved to different axial positions in response to the pressure of the exhaust provided to the actuator by the actuator control line 261 and the fitting 246. The actuator control line 261, as illustrated in FIGS. 1 and 2, is utilized to transfer exhaust from the turbine housing 114 into the actuator 116. Therefore, the actuator control line 261 is coupled to and in fluid communication with the turbine housing 114. In alternative embodiments, the actuator control line 261 may be coupled to and in fluid communication with, for example, the compressor housing 110 or a controller specifically designed to provide a desired fluid pressure to the actuator 116 in response to one or more detected conditions within an associated engine.

A jam nut 254 rotatably engages threads on the actuating shaft 252 and impinges on the linkage 250 to fix an axial position of the linkage 250 with respect to the actuating shaft 252. Therefore, the axial position of the linkage 250 relative to the actuating shaft 252 is adjustable, and may be altered by repositioning the linkage 250 and jam nut 254.

Linear movement of the actuating shaft 252 causes an actuating arm 253 to pivot, which, as will be explained in additional detail below, causes a set of vanes to pivot, thereby altering the amount of exhaust that may impinge on a turbine wheel.

It should be noted that the turbocharger 100 illustrated in FIGS. 1 and 2 serves as only one possible embodiment of the disclosed invention. For example, the shape and size of the compressor housing 110, cartridge housing 112, and turbine housing 114 may be varied within the scope of the disclosed subject matter. Also, various types of different actuators 116 may be utilized within the scope of the disclosed subject matter, such as electronic, pneumatic or hydraulic actuators.

FIGS. 3A-3C

Figure 3A:
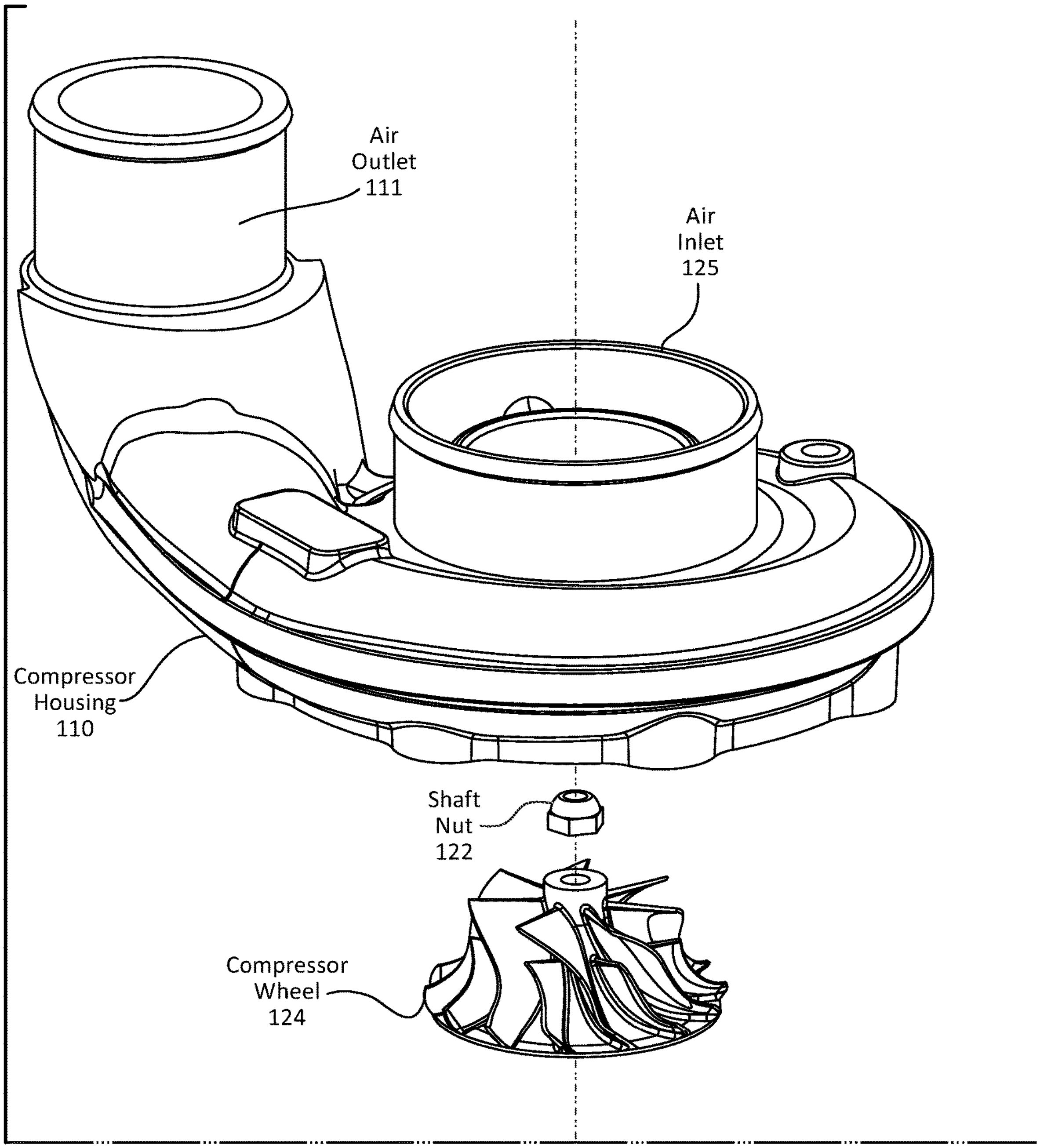
FIGS. 3A-3C jointly comprise a perspective, exploded view of the embodiment of the turbocharger shown in FIG. 1.
Figure 3B:
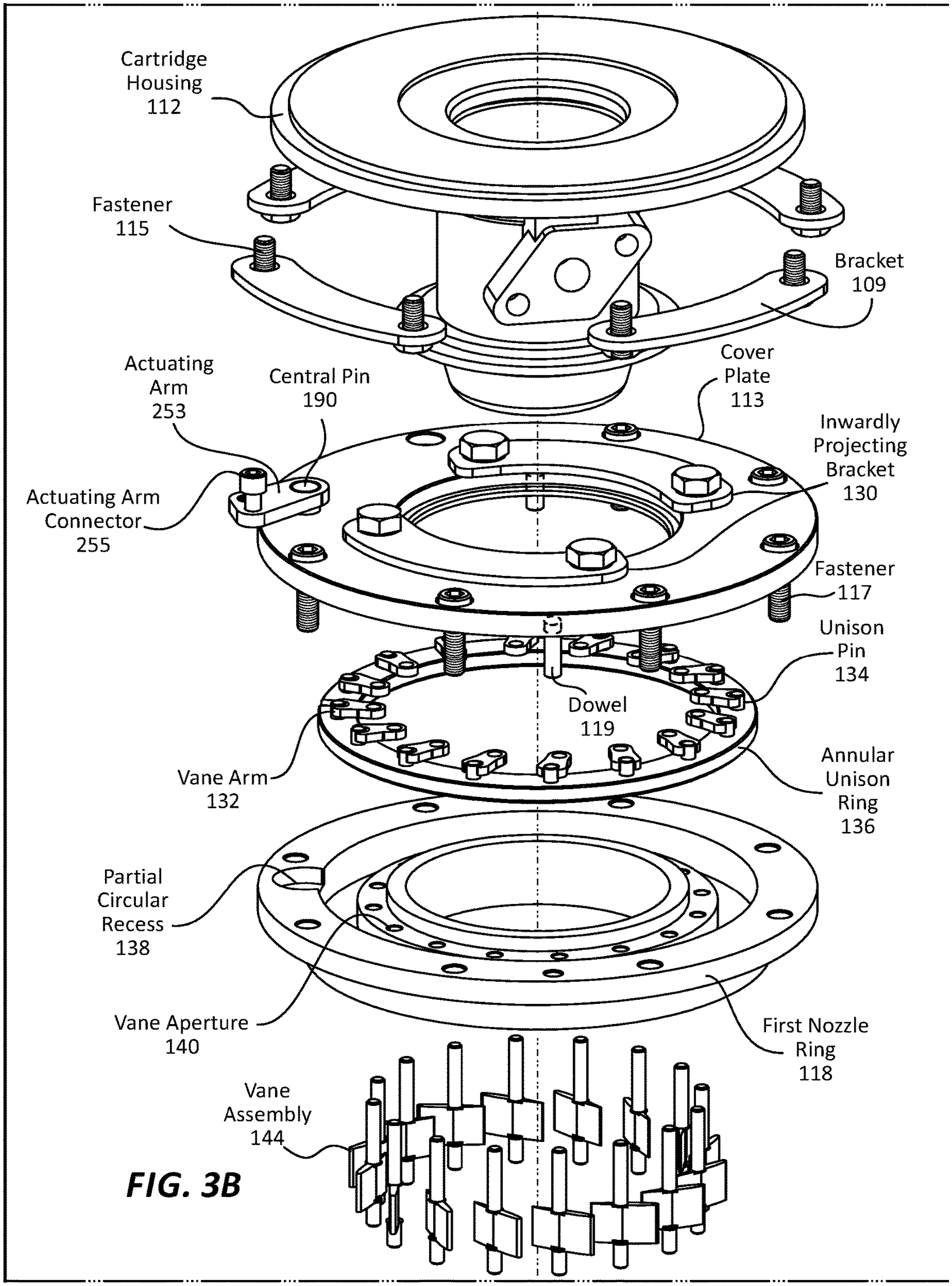
Figure 3C:
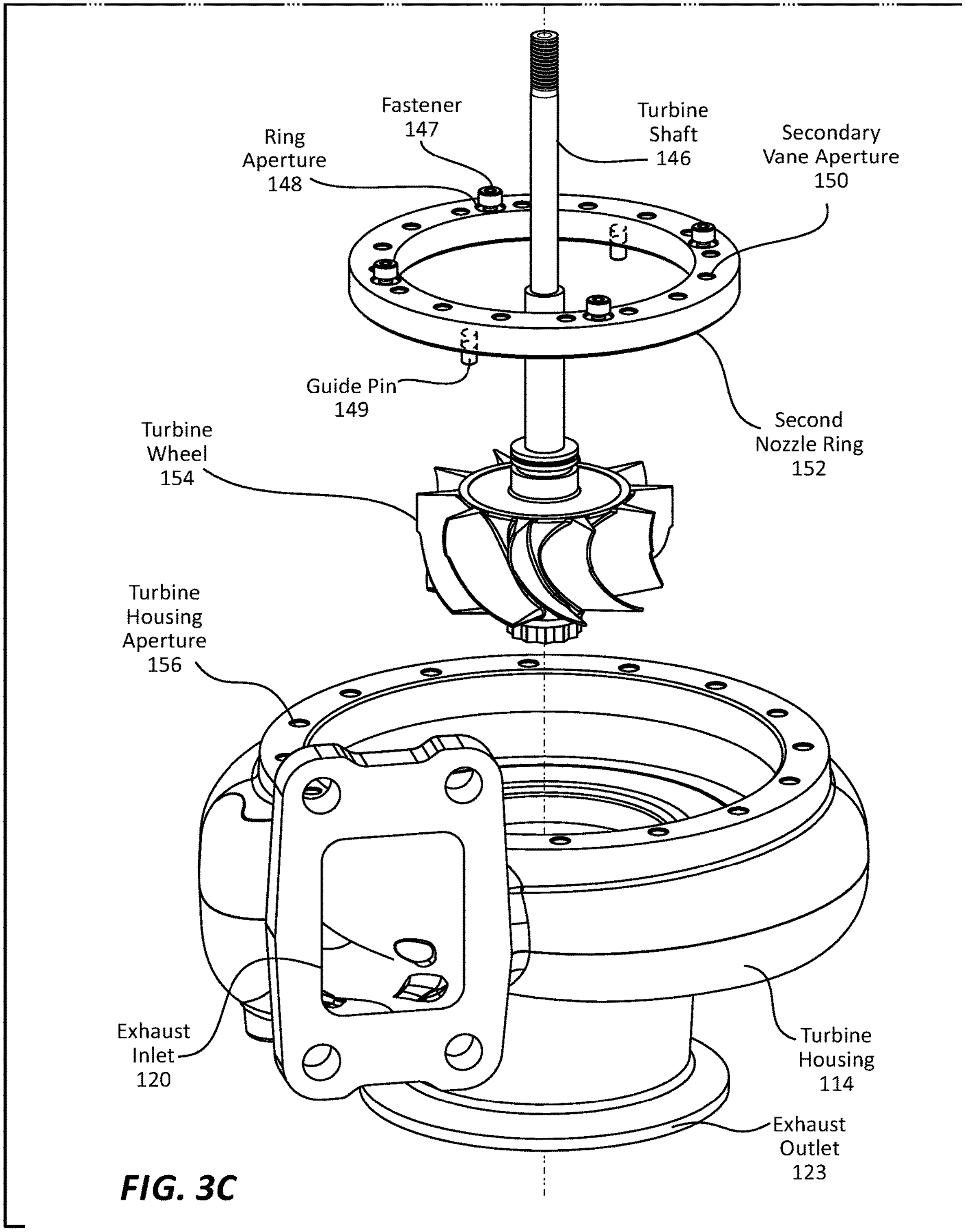

FIGS. 3A-3C jointly comprise a perspective, exploded view of the embodiment of the turbocharger 100 shown in FIG. 1. These figures will be discussed collectively.

It should be noted that, for simplicity, not all features of the turbocharger 100 are illustrated in the figures. For example, ball bearings, journal bearings or bushings, and associated structure in which the turbine shaft 146 rotates are not illustrated. In addition, it should be noted that the actuator 116, actuating arm 253, linkage 250, fitting 246, and actuator control line 261 are not illustrated in FIGS. 3A-3C but will be discussed in greater detail in connection with subsequent figures.

As illustrated in these figures, the turbocharger 100 comprises a compressor housing 110 having an air inlet 125 and an air outlet 111. A compressor wheel 124 may be positioned and secured on the turbine shaft 146 with the shaft nut 122.

The compressor wheel 124 propels the air entering through the air inlet 125 through the compressor housing 110 and out through the air outlet 111. The compressor wheel 124 is coupled to the turbine wheel 154 by the turbine shaft 146. The turbine wheel 154 rotates in response to exhaust impinging on the turbine wheel 154.

The cartridge housing 112 may be secured to the compressor housing 110 utilizing a set of one or more brackets 109 (e.g., C-shaped brackets) and fasteners 115 (e.g., a threaded bolt).

A pair of inwardly projecting brackets 130 may be used to secure the cover plate 113 to the cartridge housing 112. In addition, one or more fasteners 117 may be positioned within turbine housing apertures 156 to secure the cover plate 113 and first nozzle ring 118 to the turbine housing 114. The fasteners 117 may comprise, for example, threaded bolts. In addition, a set of one or more guide pins 119 may be positioned in one or more of the turbine housing apertures 156. Accordingly, the turbine housing apertures 156 may be threaded to receive, for example, the fasteners 117 or may be smooth to receive the guide pins 119. The guide pins 119 may be separate from or integrally formed with the cover plate 113. The guide pins 119 may be used to properly orient the cover plate 113 with respect to the turbine housing 114 while the fasteners 117 are secured in place. In various embodiments, an actuating arm 253 may pivot around a central pin 190. An actuating arm connector 255 (which may comprise, for example, a socket head screw (as illustrated in the figures), a nut and bolt assembly, or a rod with an annular recess for receiving a retaining ring or nut-and-bolt) may be used to pivotally couple the linkage 250 to actuating shaft 252. The linear movement of the linkage 250 and the actuating shaft 252 will cause the actuating arm 253 to pivot. The pivoting motion of the actuating arm 253 may be translated into rotational movement of a unison crank (discussed and illustrated subsequently) with the unison crank being disposed for rotational movement (i.e., rotatably disposed) in the partial circular recess 138 of the first nozzle ring 118. Furthermore, the unison crank may be mechanically coupled to the annular unison ring 136 such that rotational movement of the annular unison ring 136 may be translated into rotation of each vane assembly 144 when the annular unison ring 136 is rotatably disposed in the first nozzle ring 118.

Rotation of each vane assembly 144 is made possible because each vane arm 132 may be pivotally coupled to one of the unison pins 134 and is also fixedly coupled to each vane assembly 144.

Each vane assembly 144 may be rotatably disposed in a vane aperture 140 of the first nozzle ring 118 and a secondary vane aperture 150 of the second nozzle ring 152. Accordingly, rotational movement of the annular unison ring 136 within the first nozzle ring 118 causes each vane arm 132 to pivot with respect to each vane assembly 144, thereby causing each vane assembly 144 to rotate within a respective vane aperture 140 and a respective secondary vane aperture 150. The rotation of the vane assemblies 144 regulates the amount of the exhaust, and speed and angle of the exhaust that will flow between the first nozzle ring 118 and the second nozzle ring 152 and impinge upon the turbine wheel 154, thereby regulating the rotation of the turbine wheel 154. The vane assemblies 144 may also be positioned in a closed or nearly closed rotational position (as illustrated in FIG. 7B) such that exhaust flow is restricted thereby causing high pressure at the exhaust inlet 120 which then causes a feature in the coupled engine called "exhaust braking" or "compression braking."

The rotation of the turbine wheel 154 causes the turbine shaft 146 to also rotate, which, when the turbine shaft 146 is secured to the compressor wheel 124 using the shaft nut 122, also causes the compressor wheel 124 to rotate. The rotation of the compressor wheel 124 will cause air from the air inlet 125 to be pushed through the compressor housing 110 and through the air outlet 111.

As illustrated, one or more fasteners 147 may be positioned within ring apertures 148 to secure the second nozzle ring 152 to the turbine housing 114. Guide pins 149 may be utilized to properly orient the second nozzle ring 152 with respect to the turbine housing 114, for example, while the fasteners 147 are being secured to the turbine housing 114. As indicated previously, the turbine housing 114 may comprise an exhaust inlet 120 through which incoming exhaust from an engine may pass and an exhaust outlet 123 through which exhaust may exit the turbine housing 114.

FIGS. 4A-6B

Figure 4A:
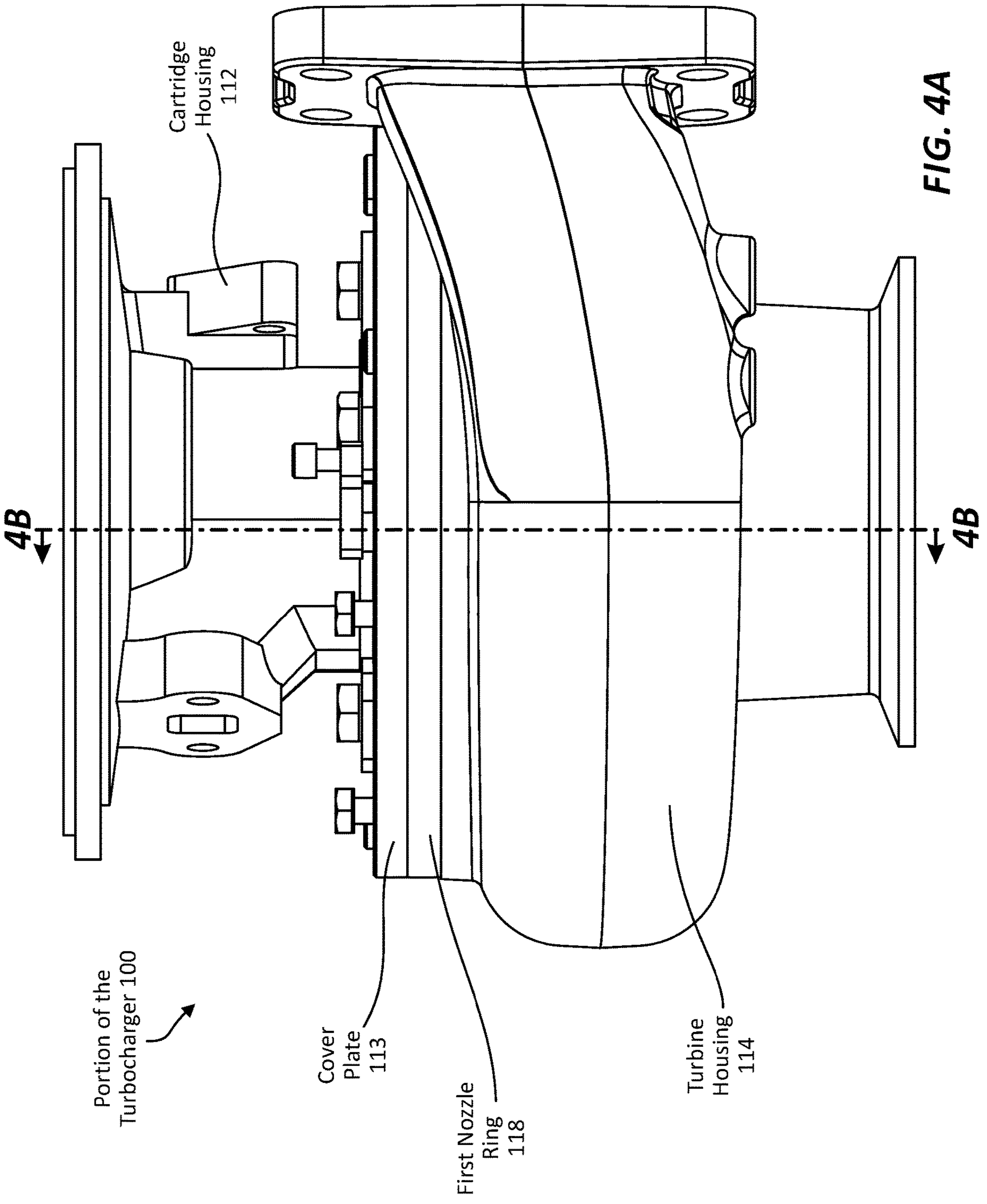
FIG. 4A is a side elevational view of a portion of the embodiment of the turbocharger shown in FIG. 1.
Figure 4B:
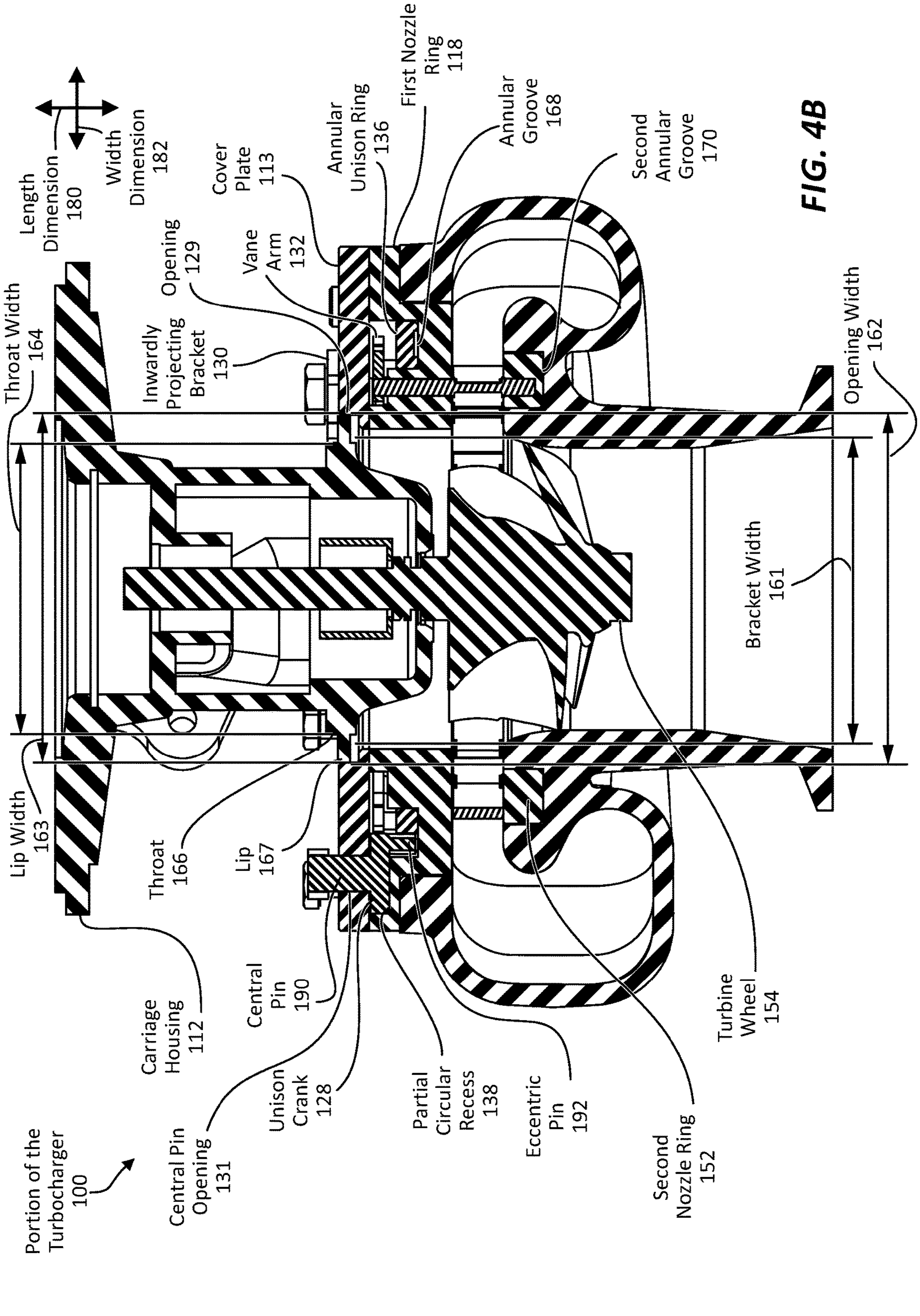
FIG. 4B is a side, cross-sectional view of the portion of the turbocharger shown in FIG. 4A taken across the line 4B-4B.
Figure 5A:
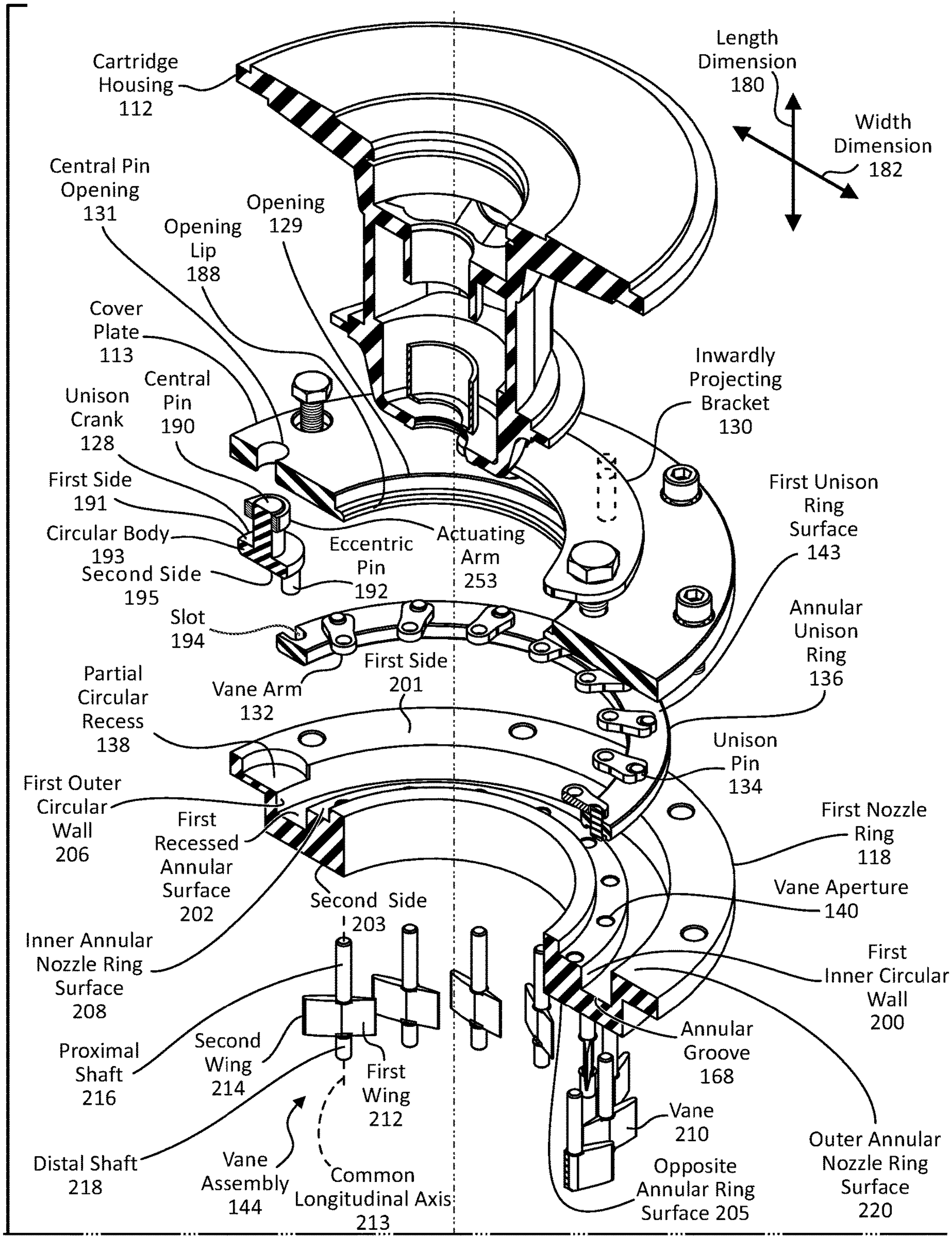
FIGS. 5A-5B jointly comprise an exploded, cross-sectional view of the portion of the turbocharger shown in FIG. 4B.
Figure 5B:
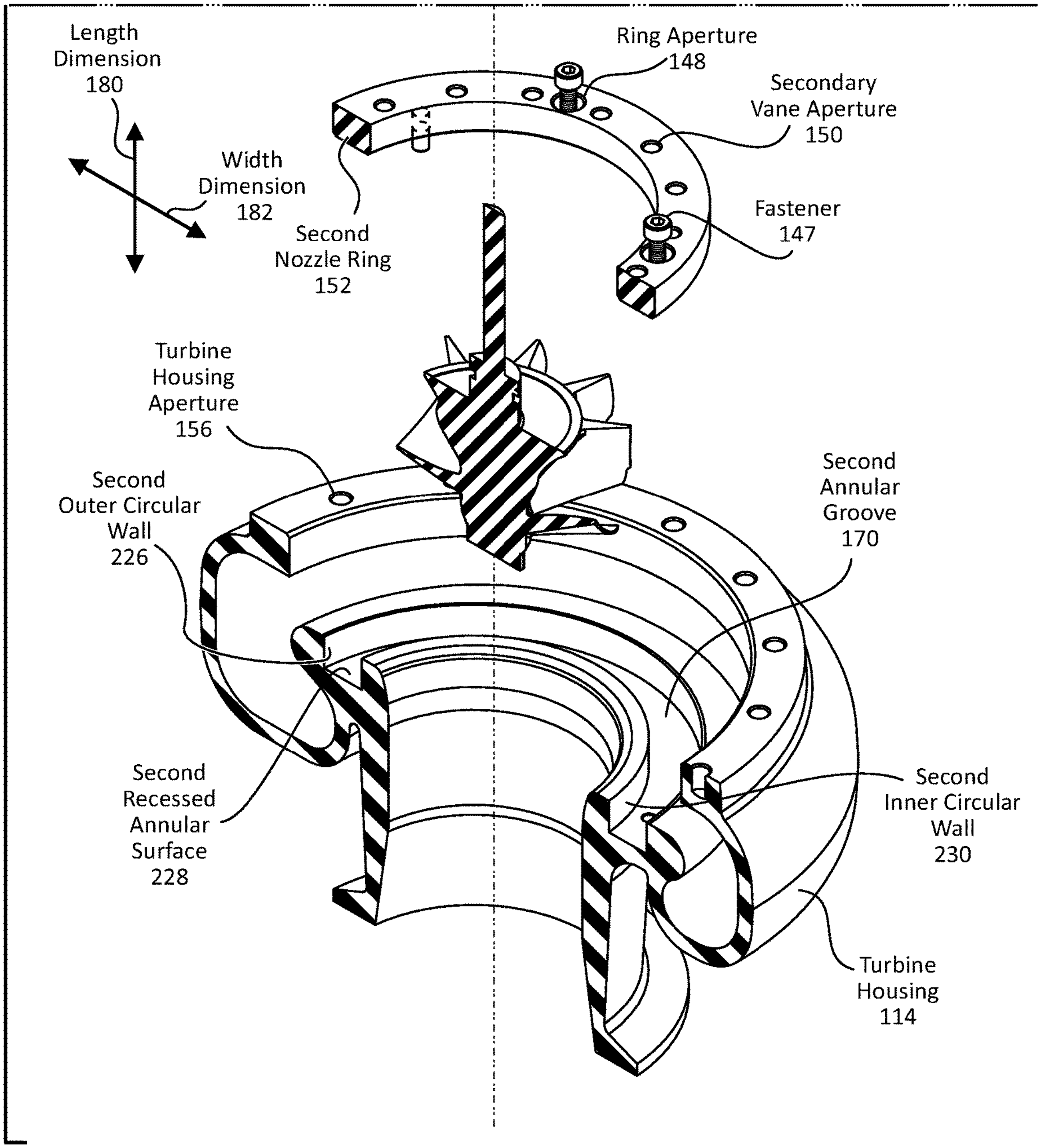
Figure 6A:
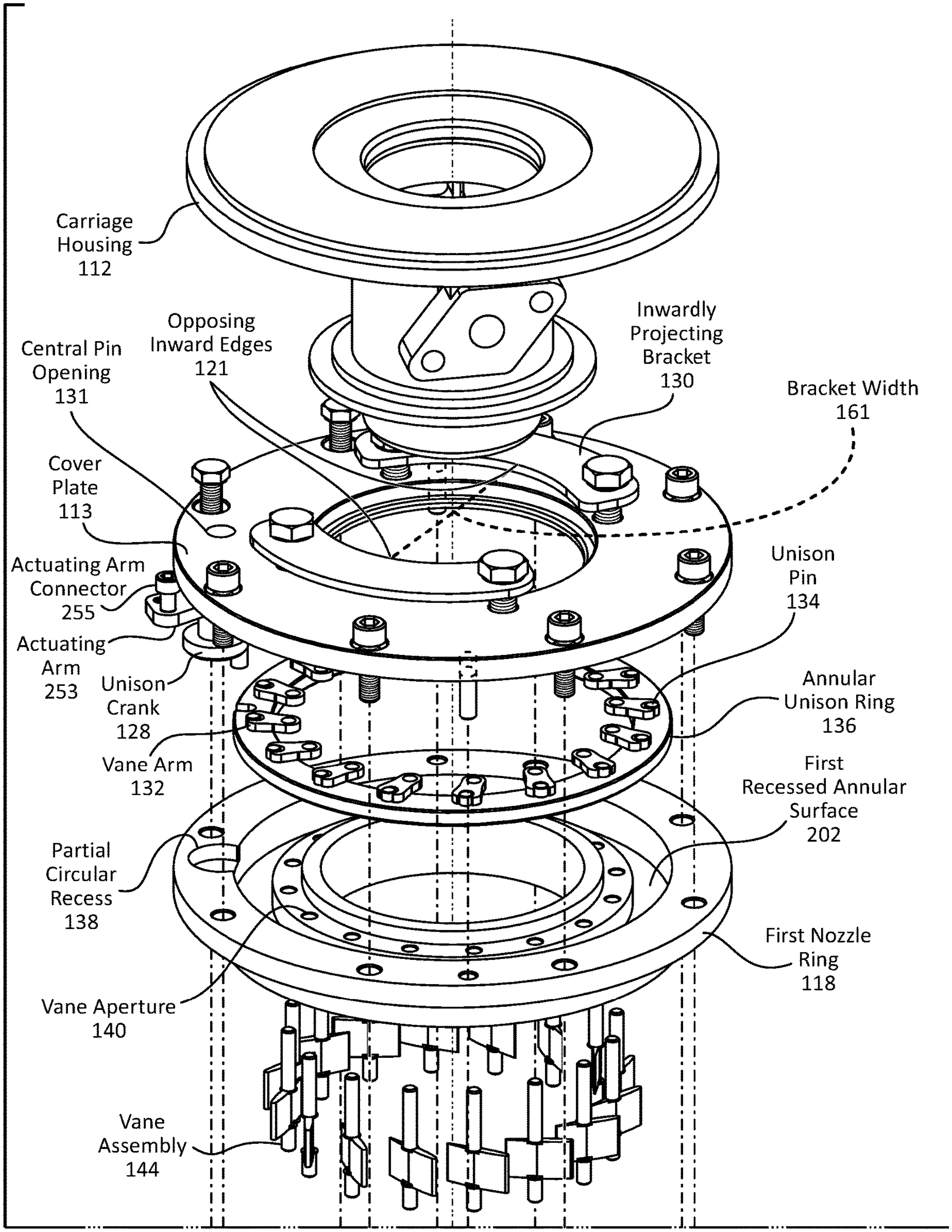
FIG. 6A-6B comprise an exploded view of the portion of the turbocharger shown in FIG. 4A.
Figure 6B:
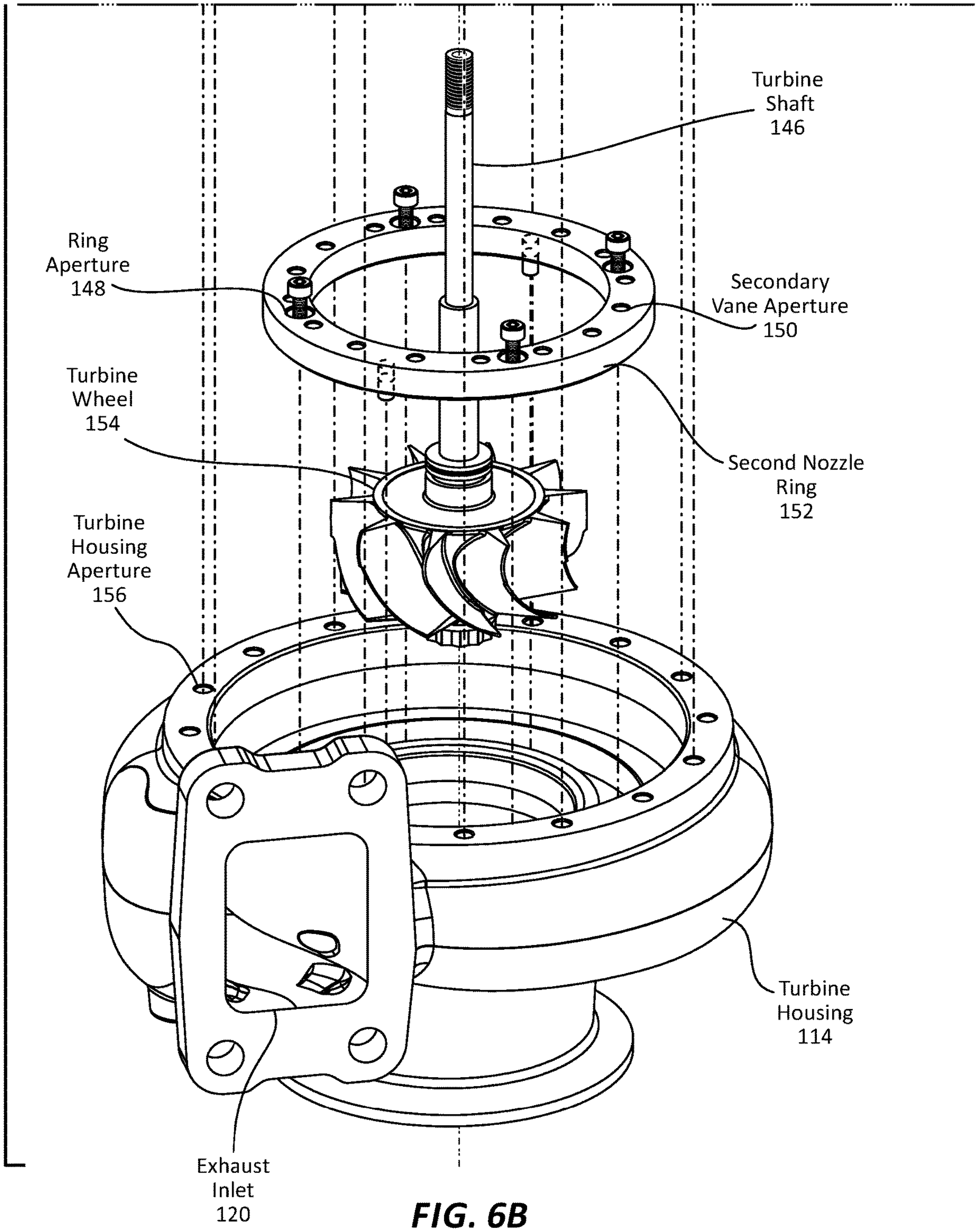

FIGS. 4A-6B will be discussed collectively. FIG. 4A is a side elevational view of a portion of the embodiment of the turbocharger shown in FIG. 1. FIG. 4B is a side, cross-sectional view of the portion of the turbocharger 100 shown in FIG. 4A taken across the line 4B-4B. FIGS. 5A-5B jointly comprise an exploded view of the portion of the turbocharger 100 shown in FIG. 4B. FIGS. 6A-6B comprise an exploded view of the portion of the turbocharger 100 shown in FIG. 4A.

It should be noted that all of the components referenced in the discussion of FIGS. 4A-6B will not be labeled with a reference numeral in each figure. However, a reference numeral will identify each discussed component in at least one of FIGS. 4A-6B.

It should be noted that the turbocharger 100 comprises a length dimension 180 (a dimension extending from the compressor housing 110 to the turbine housing 114) and a width dimension 182 (a dimension perpendicular to the length dimension 180), which is illustrated in dimensional keys in FIGS. 4B, 5A and 5B.

It should also be noted that FIGS. 4A-6B illustrate only a portion of the turbocharger 100. Thus, in these figures, for example, the compressor housing 110, air outlet 111, shaft nut 122, linkage 250, actuator 116, fitting 246, actuator control line 261 and compressor wheel 124 have been omitted to better illustrate the remaining components.

It should also be noted that the cross-sectional cut illustrated in FIG. 4A along the line 4B-4B is offset from a centerline across the width dimension 182 of the portion of the turbocharger 100 and that the turbine shaft 146 is of a terraced width such that only a portion of the turbine shaft 146 is visible in FIGS. 4B and 5B. However, the turbine shaft 146 is visible in FIG. 6B.

Now with reference to FIG. 4A-6B, the illustrated cartridge housing 112 may comprise a throat 166 and a lip 167. The lip 167 may have a lip width 163 (along the width dimension 182) and the throat 166 may have a throat width 164 (also along the width dimension 182). The lip width 163 is greater than the throat width 164. The cover plate 113 includes an opening 129 having an opening width 162. The lip width 163 may be less than or equal to the opening width 162. The inwardly projecting brackets 130 comprise inwardly opposing edges 121 that define a bracket width 161 when the inwardly projecting brackets 130 are secured to the cover plate 113. The bracket width 161 is less than the lip width 163 but greater than or equal to the throat width 164 such that the lip 167 is retained within the opening 129 when the inwardly projecting brackets 130 are secured to the cover plate 113. In various embodiments, the cover plate 113 may comprise an opening lip 188 to limit movement of the lip 167 of the cartridge housing 112 along the length dimension 180 when the lip 167 is secured by the inwardly projecting brackets 130.

As indicated previously, the unison crank 128 may be coupled to linkage 250 by the actuating arm 253 and actuating arm connector 255, which are in turn coupled to the actuating shaft 252. The unison crank 128 may comprise a circular body 193 having a first side 191 and a second side 195. A central pin 190 extends from the first side 191 and an eccentric pin 192 extends from the second side 195. The central pin 190 is centrally disposed on the first side 191, while the eccentric pin 192 is offset relative to a center point of the circular body 193 on the second side 203. The central pin 190 may be rotatably positioned within a central pin opening 131 of the cover plate 113.

The actuator 116 and linkage 250 may cause the circular body 193 to rotate within the partial circular recess 138. The eccentric pin 192 may be disposed in the slot 194 of the annular unison ring 136. In various embodiments, and as illustrated, the slot 194 may be in the outer periphery of the annular unison ring 136. Thus, when the annular unison ring 136 is rotatably disposed in the annular groove 168 and the eccentric pin 192 is positioned within the slot 194, rotation of the unison crank 128 will cause the annular unison ring 136 to rotate within the annular groove 168.

In one embodiment, the slot 194 has an open end, as illustrated in the figures. In an alternative embodiment, the slot 194 may have an enclosed end and thus may simply be an enclosed opening positioned in the annular unison ring 136.

The annular unison ring 136 comprises a series of unison pins 134 extending away from a first unison ring surface 143. A vane arm 132 is slidably coupled to each unison pin 134 and is fixedly coupled to a vane assembly 144. The unison pins 134 may be integrally formed with the annular unison ring 136 or may be separately formed and engage the annular unison ring 136.

As illustrated, a first side 201 of the first nozzle ring 118 may comprise an outer annular nozzle ring surface 220, an annular groove 168, and an inner annular nozzle ring surface 208. A second side 203 of the first nozzle ring 118 is disposed opposite the first side 201. The second side 203 may comprise an opposite annular ring surface 205. Each vane aperture 140 may extend through the first nozzle ring 118 from the inner annular nozzle ring surface 208 to the opposite annular ring surface 205. The partial circular recess 138 is disposed in the outer annular nozzle ring surface 220.

The annular groove 168 comprises a first inner circular wall 200, a first recessed annular surface 202, and a first outer circular wall 206. The first recessed annular surface 202 is offset from the outer annular nozzle ring surface 220 along the length dimension 180 and is disposed between the first inner circular wall 200. In various embodiments, the first recessed annular surface 202 may be substantially parallel to the outer annular nozzle ring surface 220.

Each vane assembly 144 may comprise a proximal shaft 216, a distal shaft 218, and a vane 210. The proximal shaft 216 and the distal shaft 218 may extend along or be coaxial with a common longitudinal axis 213. The vane 210 may be disposed intermediate the proximal shaft 216 and the distal shaft 218. As illustrated, each vane 210 may comprise a first wing 212 and a second wing 214, each of which may extend away from the common longitudinal axis 213. As illustrated, the first wing 212 and the second wing 214 are symmetrical about the common longitudinal axis 213. In various alternative embodiments, the wings 212, 214 may be of a symmetrical shape that is different than the shape illustrated in the figures, or one wing 212, 214 may be longer than the other or may have a different shape than the other. Also, each of the wings 212, 214 may be embodied in different ways and may not necessarily extend directly opposite one another relative to the common longitudinal axis 213.

The second nozzle ring 152 comprises a plurality of secondary vane apertures 150 for receiving a remote end of the distal shaft 218. The second nozzle ring 152 also includes a plurality of ring apertures 148 for receiving a fastener 147 with the fasteners 147 being utilized to secure the second nozzle ring 152 to the turbine housing 114 and, in particular, within the second annular groove 170.

As indicated above, the turbine housing 114 comprises a plurality of turbine housing apertures 156 for receiving fasteners 117 or guide pins 119. The second annular groove 170 comprises a second outer circular wall 226, a second recessed annular surface 228, and a second inner circular wall 230. In one embodiment, the second nozzle ring 152 is integrally formed with the turbine housing 114. One reason for separately forming the second nozzle ring 152 from the turbine housing 114 is that different materials may be used for the second nozzle ring 152. Additionally or alternatively, a metal from which the second nozzle ring 152 is made may be hardened to increase the durability and lifespan of the turbocharger 100.

When assembled, the proximal shaft 216 of each vane assembly 144 is rotatably disposed in one of the vane apertures 140 with the vane 210 disposed adjacent to the second side 203 and a remote end of the proximal shaft extends through the inner annular nozzle ring surface 208. A remote end of the distal shaft 218 of each vane assembly 144 is rotatably disposed in a secondary vane aperture 150 of the second nozzle ring 152. Accordingly, each vane assembly 144 may pivot about the common longitudinal axis 213.

Accordingly, when the annular unison ring 136 rotates within the annular groove 168 (in response to movement of the actuator 116, linkage 250, and the unison crank 128), each of the unison pins 134 is moved, thereby causing each vane arm 132 to pivot with respect to the common longitudinal axis 213, thereby causing openings intermediate the vanes 210 to increase or decrease in size and thus regulating the flow, speed, and angle of exhaust (received via the exhaust inlet 120) to the turbine wheel 154. The regulation of the flow of exhaust into the turbine wheel 154 regulates the rotation of the compressor wheel 124, which affects how much air is injected into an engine that is in fluid communication with the air outlet 111.

FIGS. 7A-7B

Figure 7A:
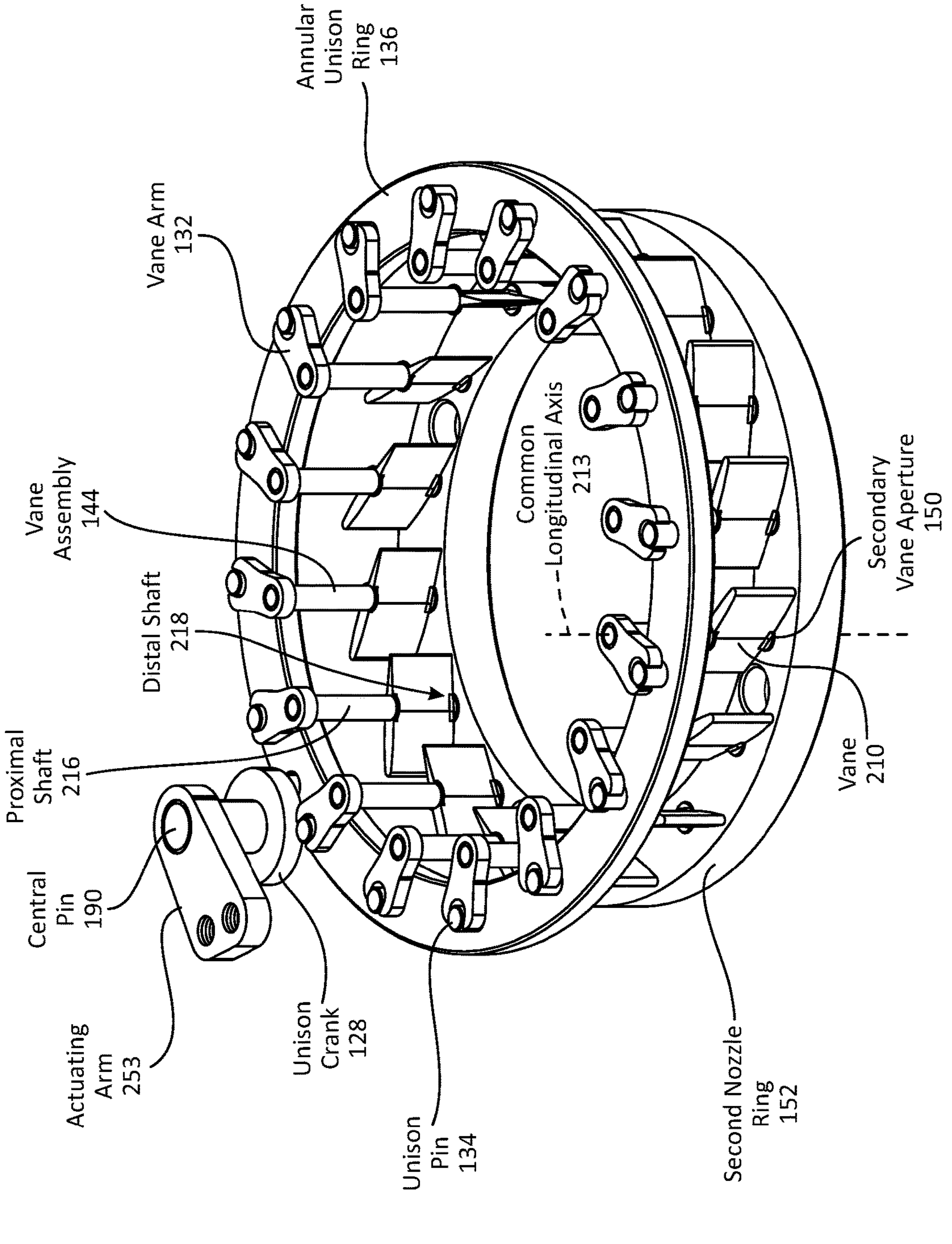
FIG. 7A is a perspective view of one embodiment of a combination of an actuating arm, a central pin, an annular unison ring, a second nozzle ring, and a unison crank with a plurality of unison pins, vane arms, and vane assemblies in an assembled state with the vane assemblies in one possible partially open position.
Figure 7B:
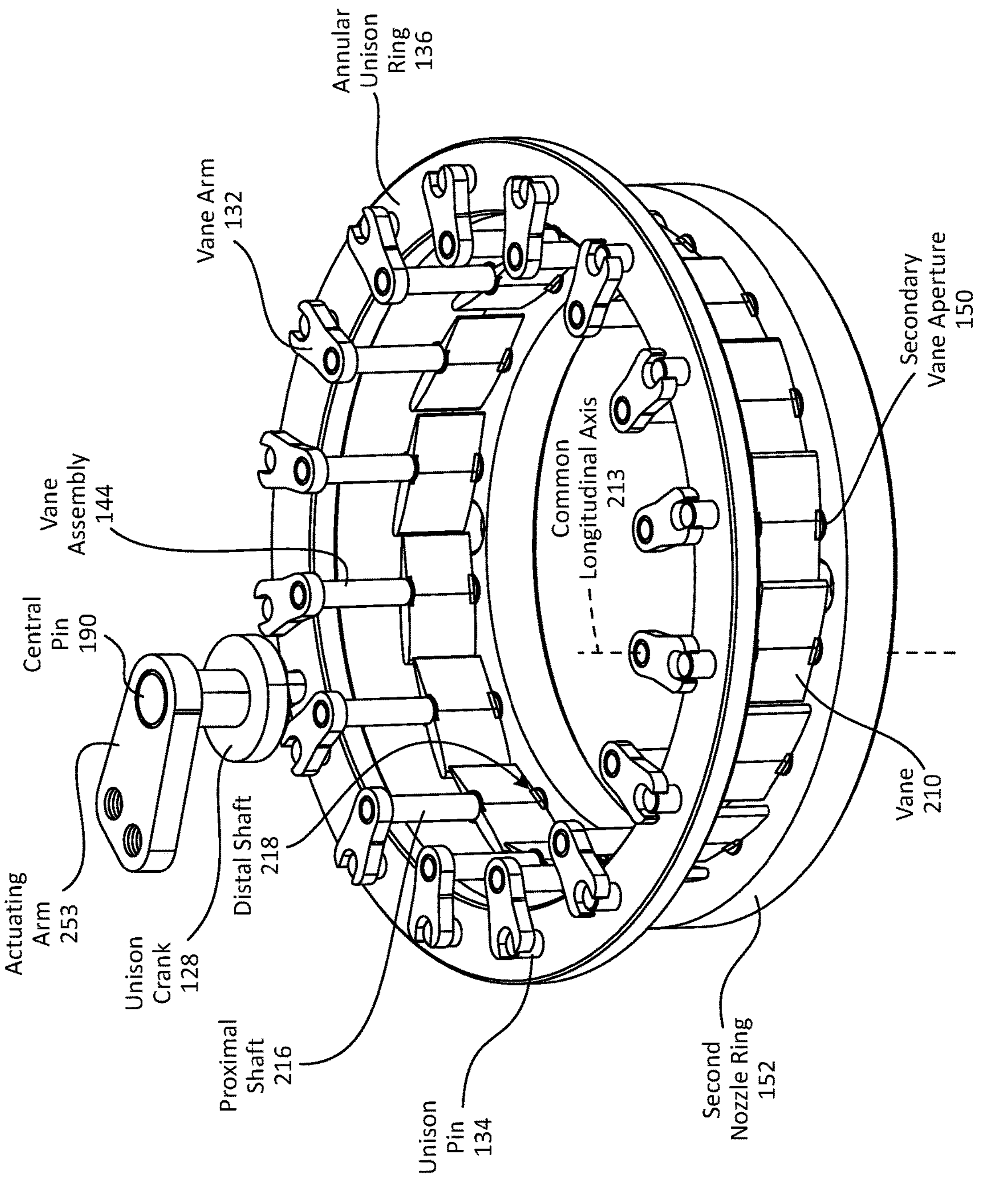
FIG. 7B is a perspective view of one embodiment of a combination of an actuating arm, a central pin, an annular unison ring, a second nozzle ring, and a unison crank with a plurality of unison pins, vane arms, and vane assemblies in an assembled state with the vane assemblies in a closed position.

FIG. 7A is a perspective view of one embodiment of a combination of an annular unison ring 136, a second nozzle ring 152, and a unison crank 128 with a plurality of unison pins 134, vane arms 132, and vane assemblies 144 in an assembled state with the vane assemblies 144 in one possible open position. FIG. 7B illustrates the same components but with the vane assemblies 144 in a closed position. FIG. 7A-7B will be discussed concurrently. As illustrated in these figures, in response to rotation of the unison crank 128, which is controlled by the actuator 116, the annular unison ring 136 rotates. This rotation, in turn, causes each of the vane arms 132 to pivot with respect to the common longitudinal axis 213 of each vane assembly 144 (i.e., to pivot with the distal shaft 218 at least partially disposed in a secondary vane aperture 150). It should also be noted, although not illustrated in FIGS. 7A-7B, the proximal shaft 216 of each vane assembly 144 may rotate within a vane aperture 140 of the first nozzle ring 118. Because each of the vane arms 132 are fixedly coupled to one of the vane assemblies 144, the rotation of the vane arms 132 causes each vane assembly 144 and the vanes 210 to pivot with respect to each common longitudinal axis 213, which alters openings between the vanes 210. Consequently, openings between the vanes 210 may be altered to regulate the amount and angle of exhaust flowing into and striking the turbine wheel 154.

FIG. 8

Figure 8:
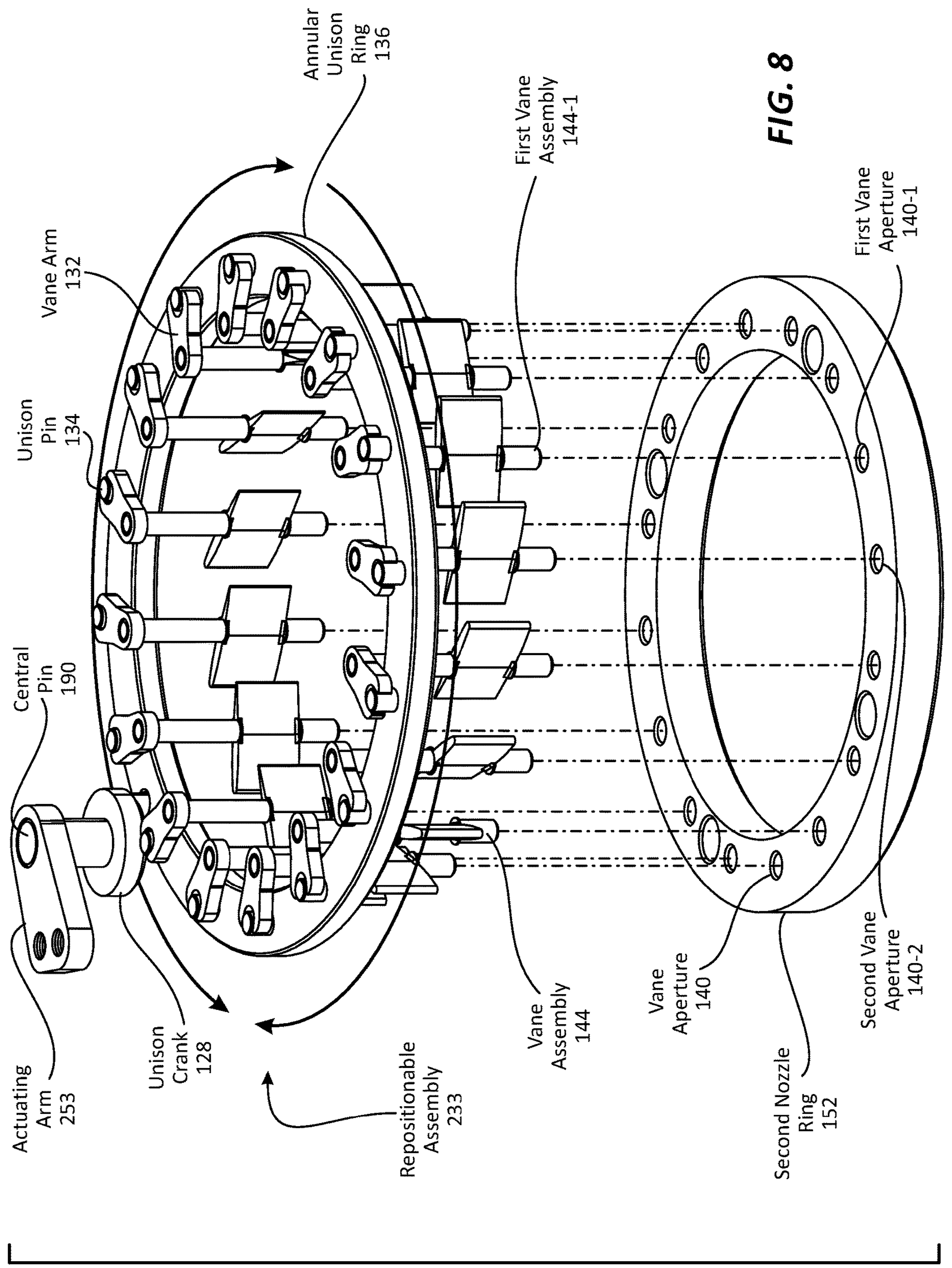
FIG. 8 is a perspective view of one embodiment of a combination of an actuating arm, a central pin, an annular unison ring, a second nozzle ring, and a unison crank with a plurality of unison pins, vane arms, and vane assemblies with the second nozzle ring spaced apart from the vane assemblies.
Figure 9:
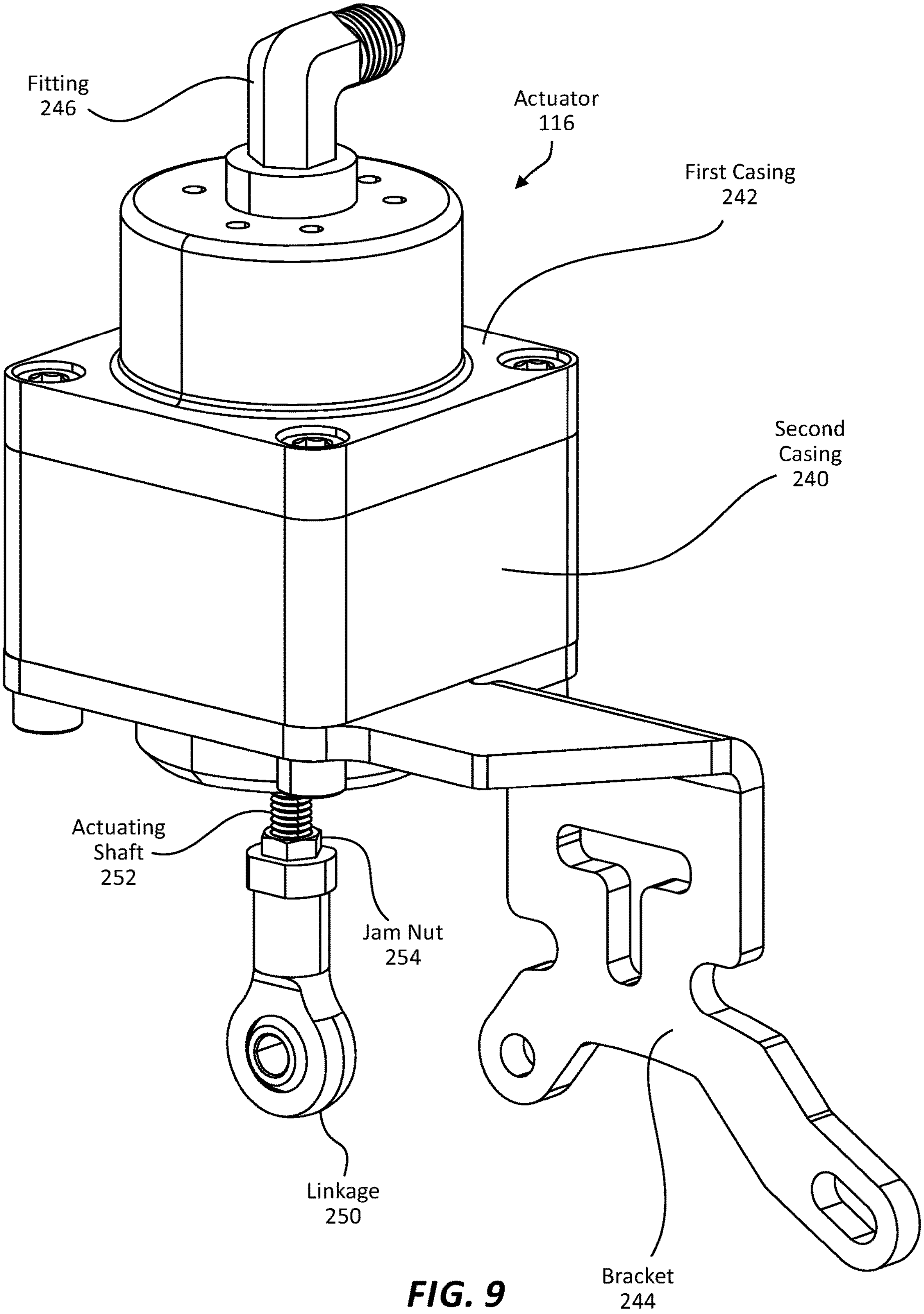
FIG. 9 is a perspective view of the embodiment of the multi-stage actuator shown in FIG. 1.
Figure 10:
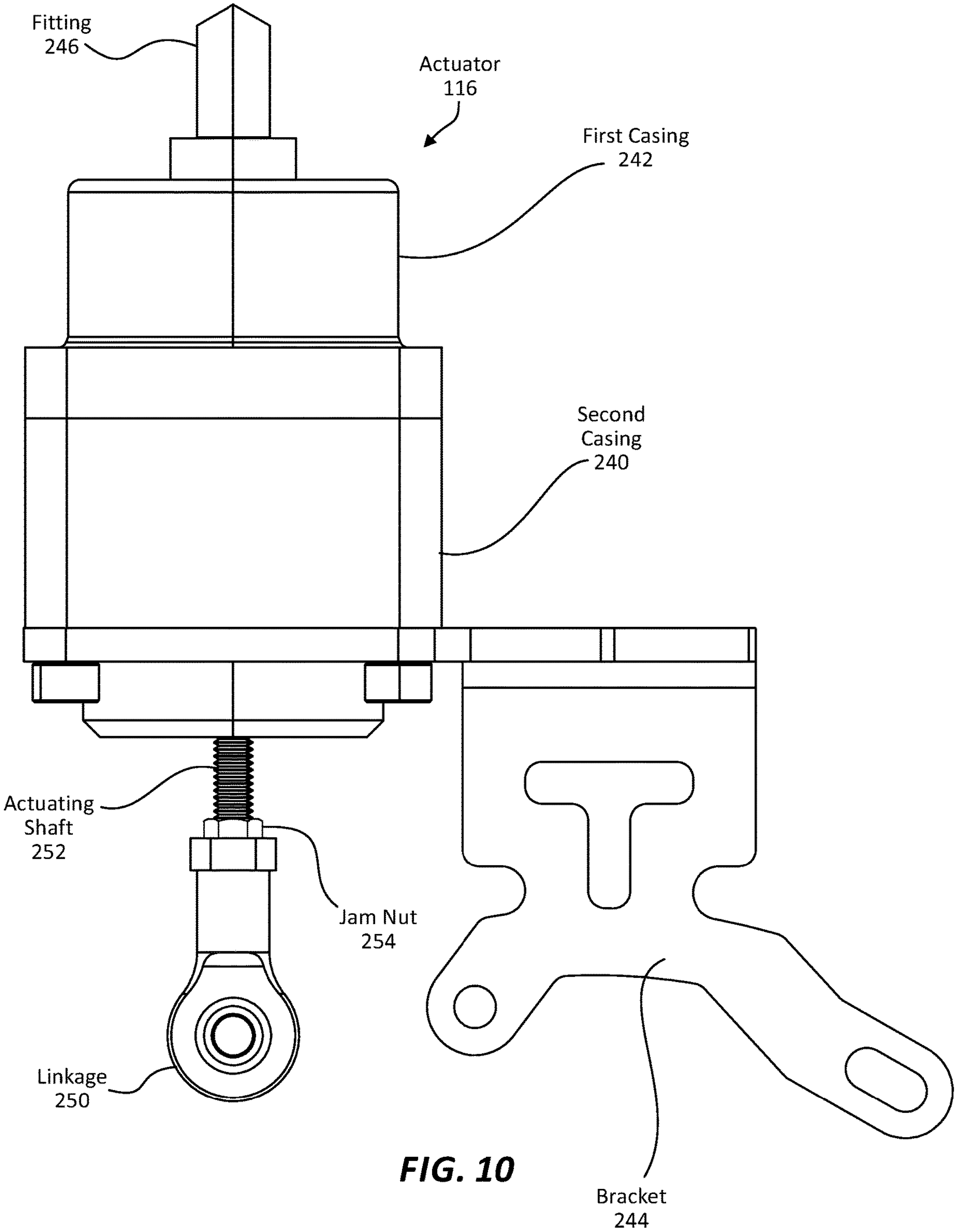
FIG. 10 is a side, elevational view of the embodiment of the multi-stage actuator shown in FIG. 1.
Figure 11A:
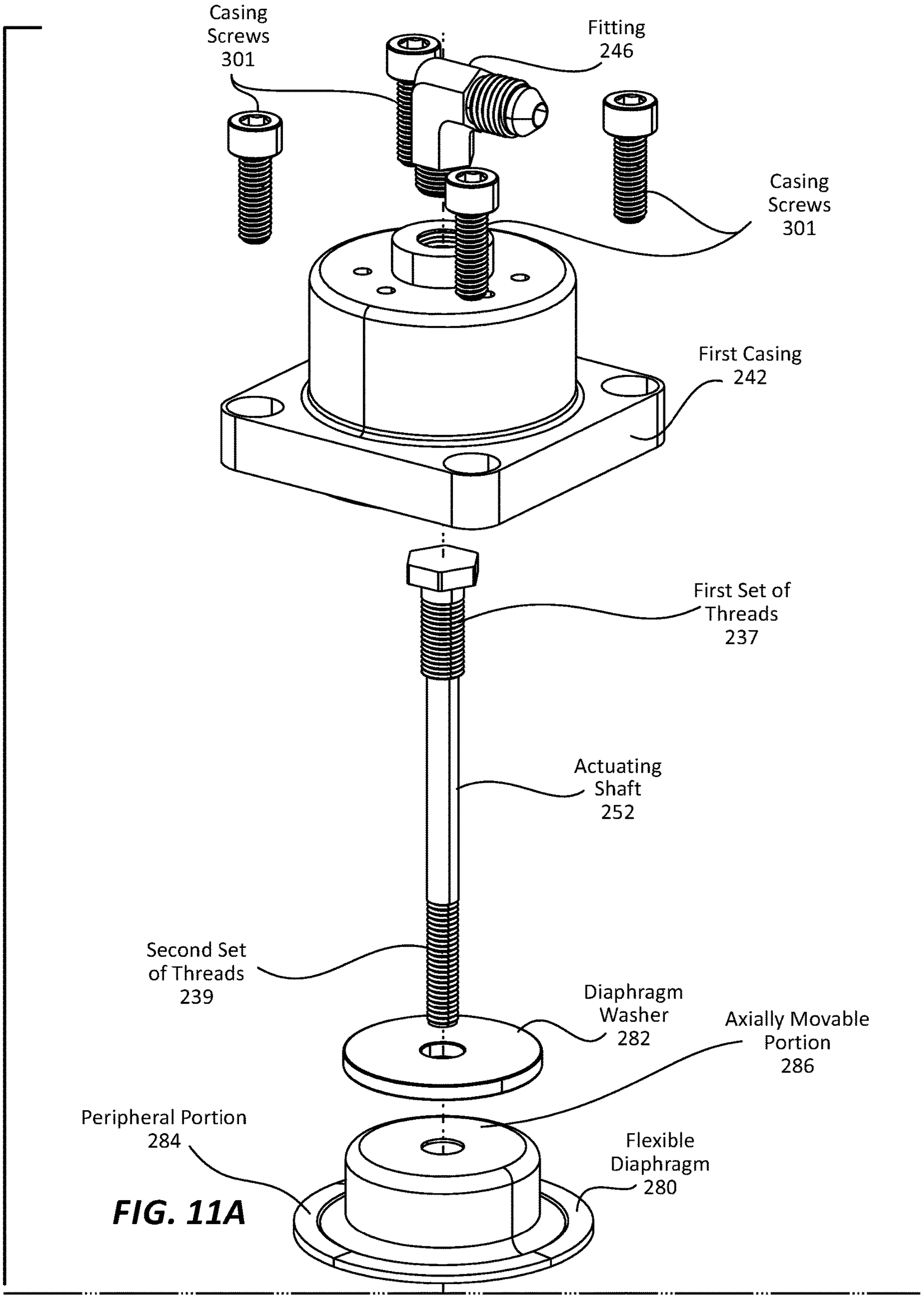
FIGS. 11A-11C jointly comprise an exploded view of the multi-stage actuator shown in FIG. 1.
Figure 11B:
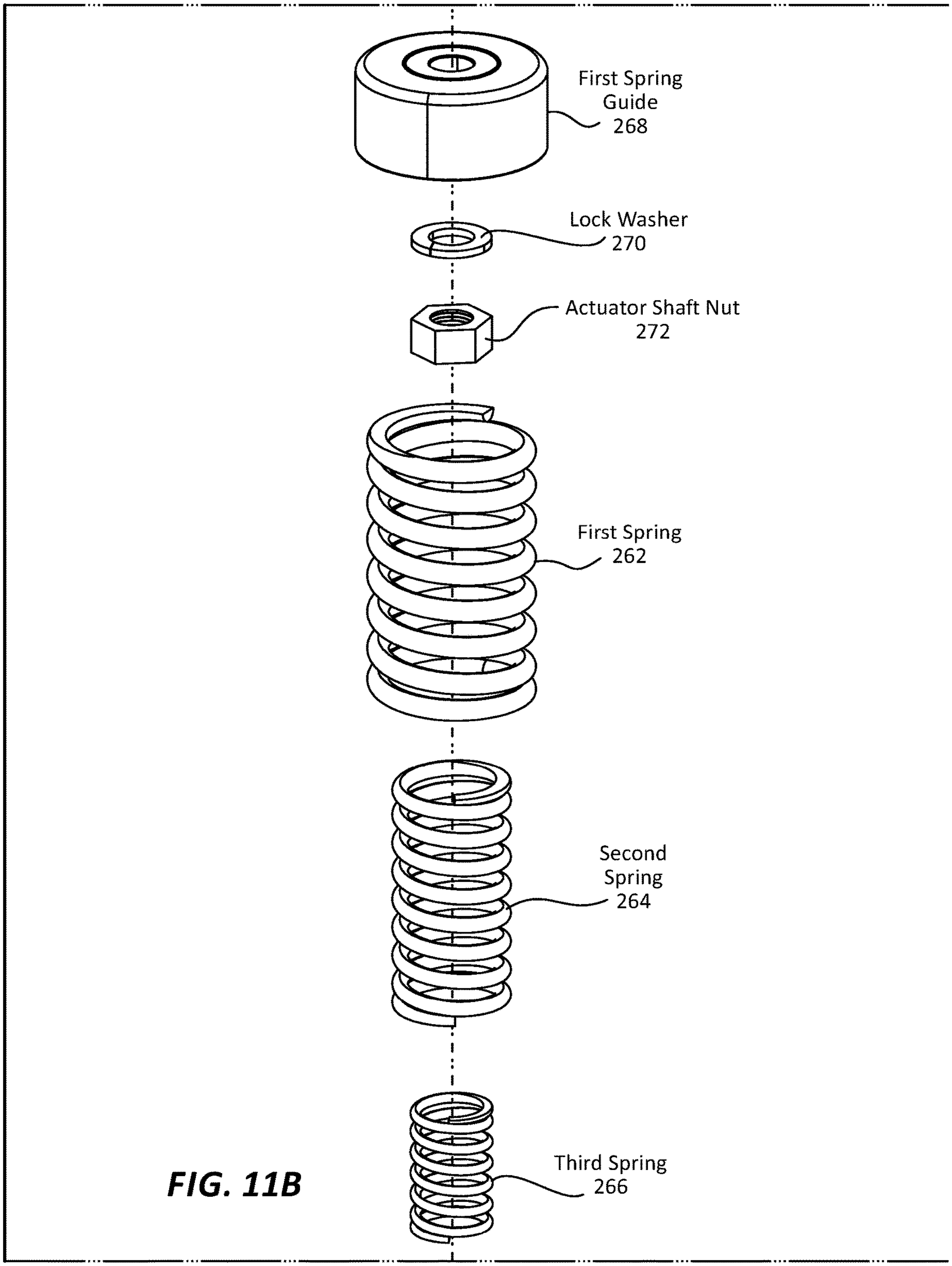
Figure 11C:
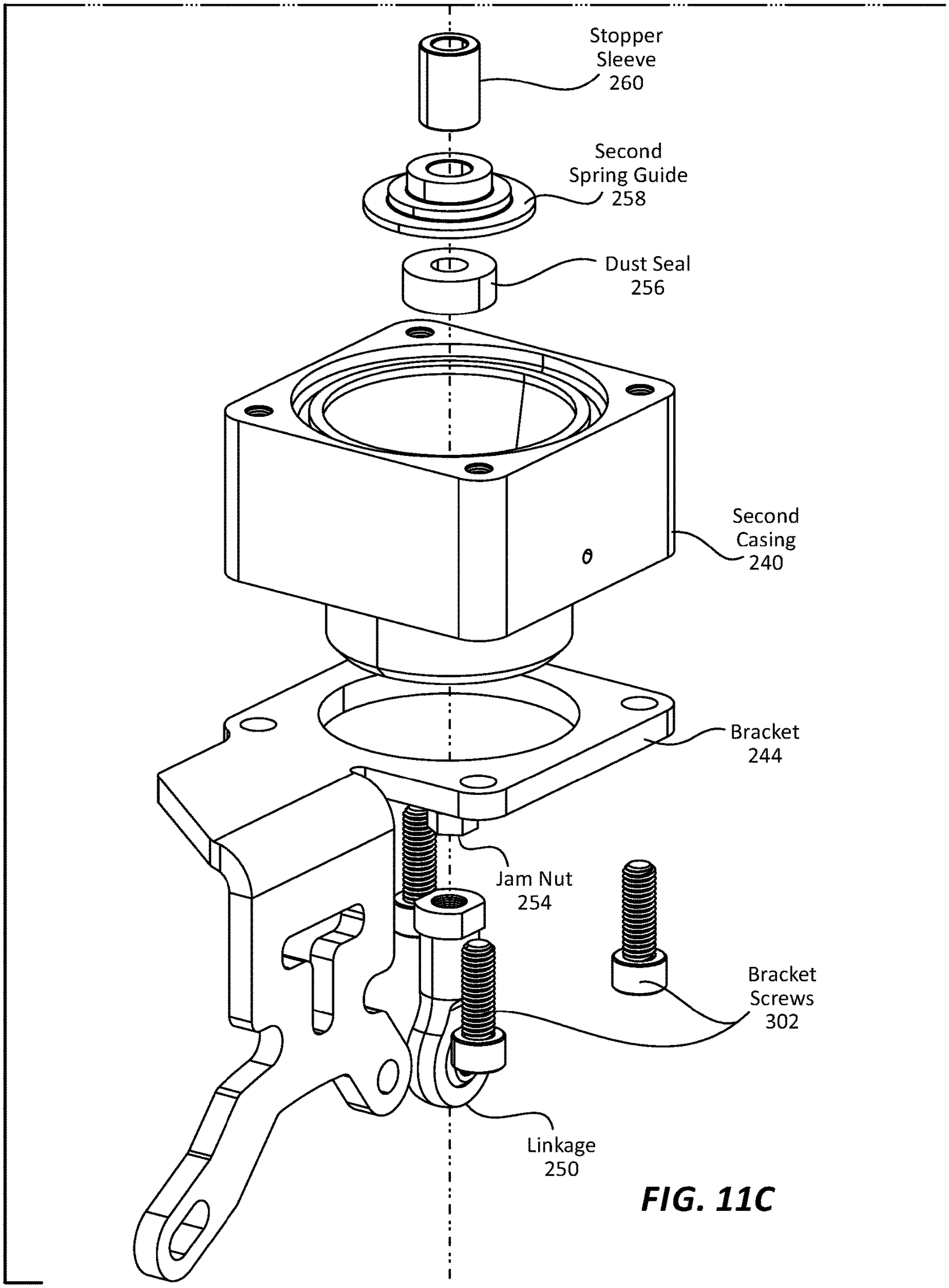
Figure 12A:
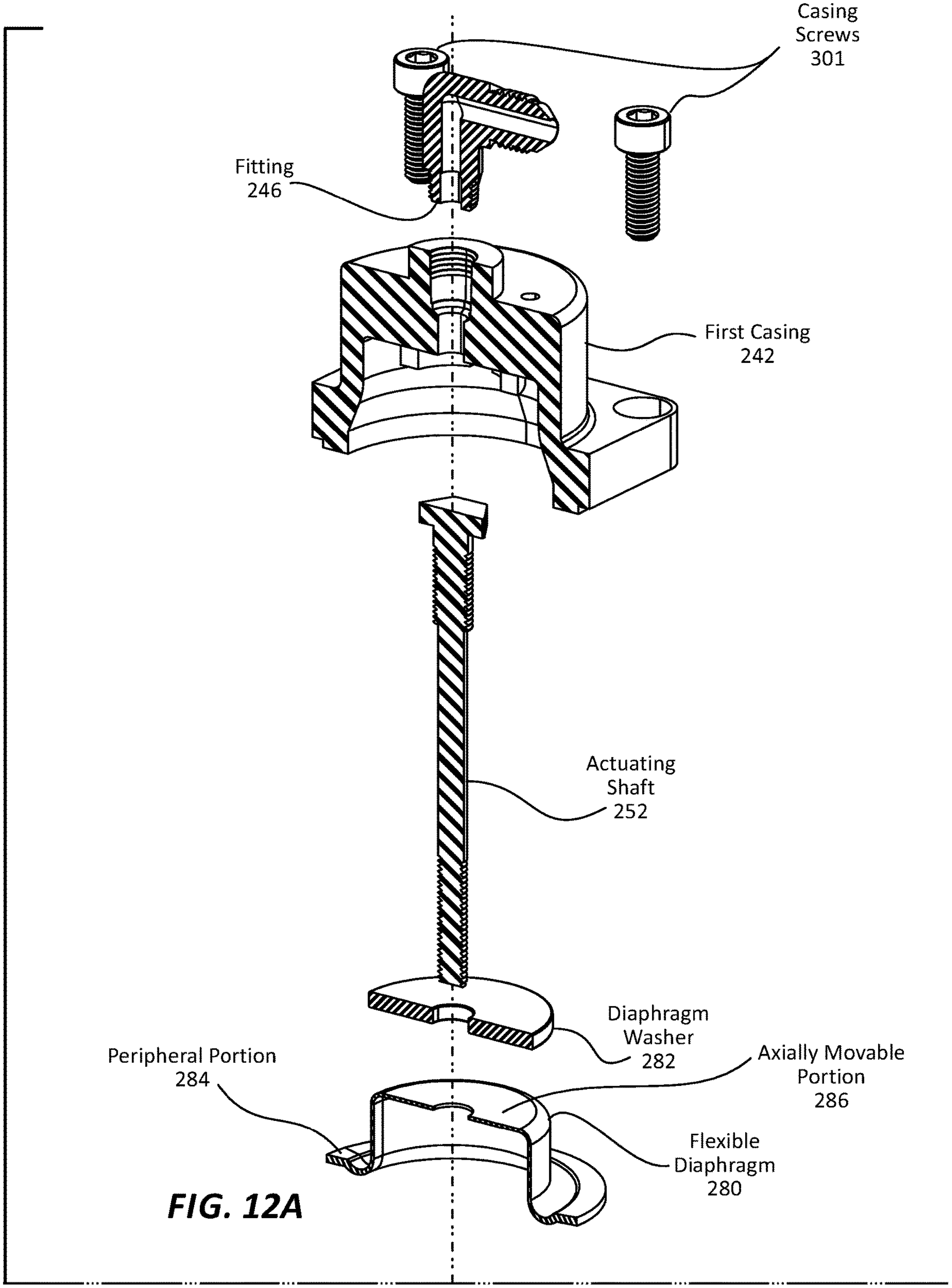
FIGS. 12A-12C jointly comprise an exploded cross-sectional view of the multi-stage actuator shown in FIG. 1.
Figure 12B:
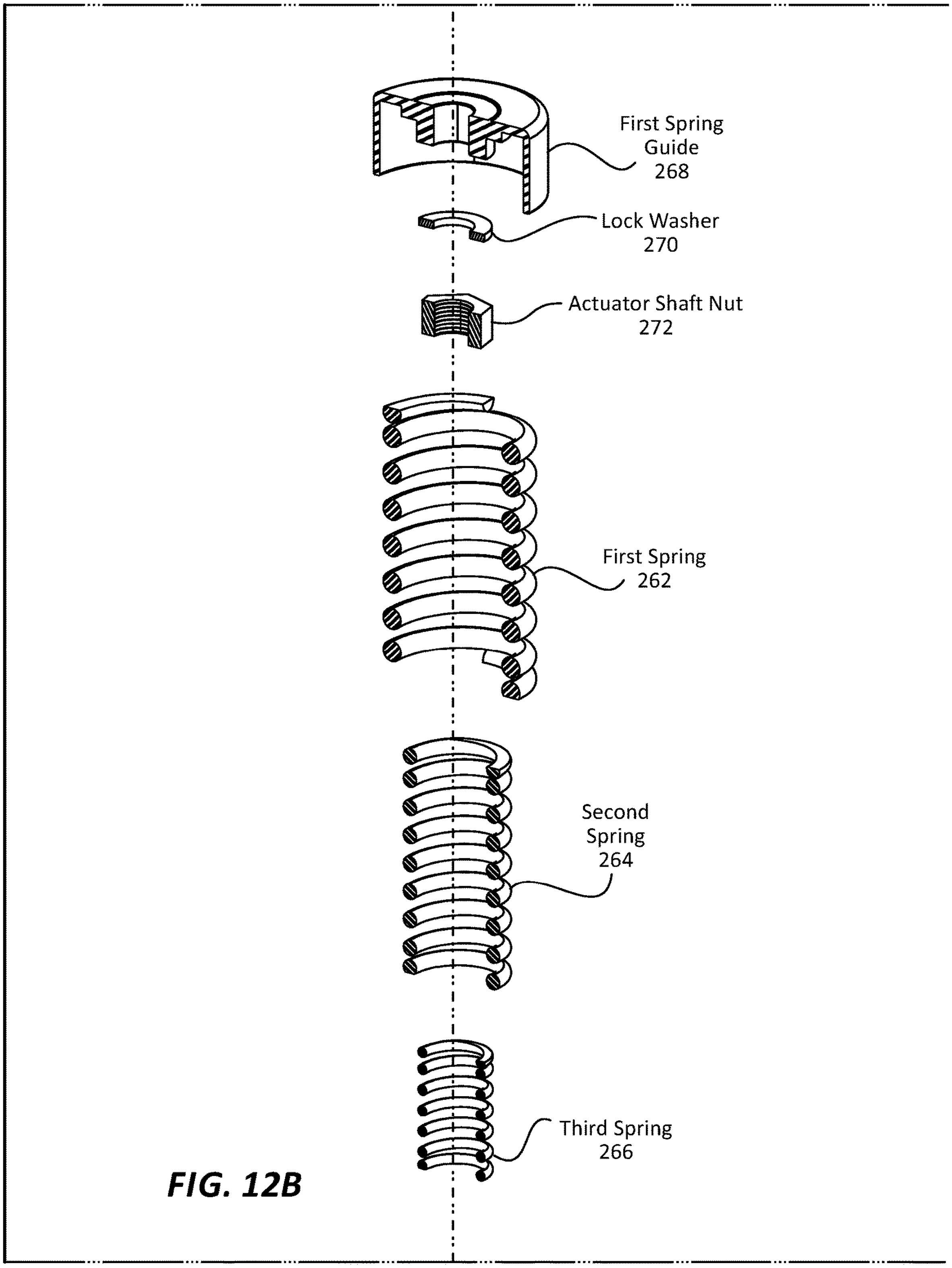
Figure 12C:
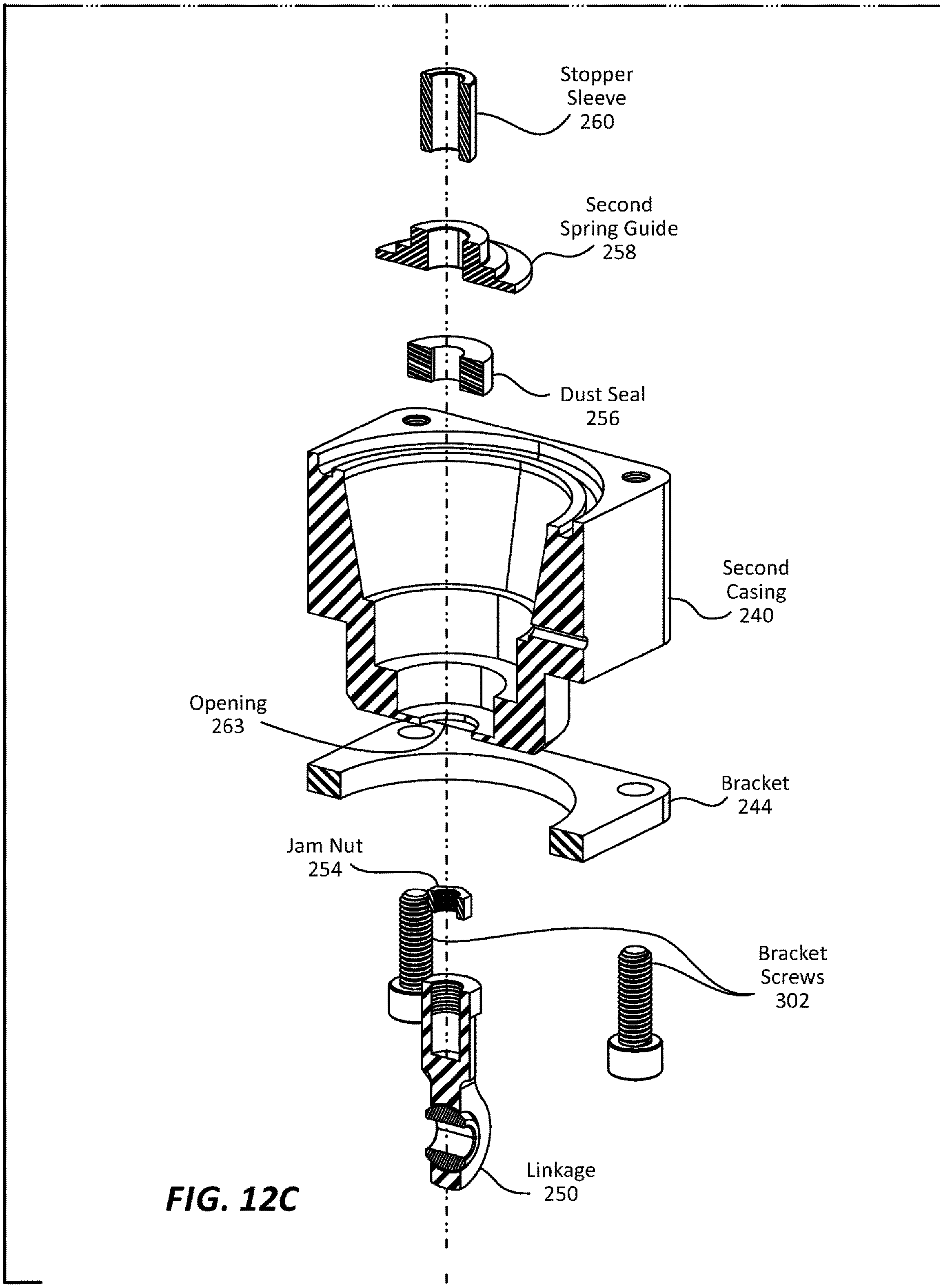

FIG. 8 is a perspective view of one embodiment of a combination of an annular unison ring 136, a second nozzle ring 152, and a unison crank 128 with a plurality of unison pins 134, vane arms 132, and vane assemblies 144 (including a first vane assembly 144-1) with the second nozzle ring 152 spaced apart from the vane assemblies 144. A combination of the annular unison ring 136, a unison crank 128, unison pins 134, the vane arms 132, and vane assemblies 144 (which may collectively be referred to as a repositionable assembly 233) may be positioned at different rotational orientations with respect to the second nozzle ring 152. For example, the repositionable assembly 233 may be positioned at different rotational orientations with respect to the second nozzle ring 152 such that the first vane assembly 144-1 is positioned in the first vane aperture 140-1, positioned in a secondary vane aperture 140-2 or positioned in any of the remaining vane apertures 140.

The different rotational orientations allow positioning of the unison crank 128, actuator 116 and/or linkage 250 at different locations to accommodate space available within a particular vehicle. In various embodiments, linkage 250 of different lengths or configurations may be used to accommodate and avoid impinging on, for example, the exhaust inlet 120.

FIGS. 9-12C

FIGS. 9-12C provide various views of the actuator 116, the fitting 246 and the bracket 244. As noted previously, the actuator 116 axially repositions the actuating shaft 252 and linkage 250 in response to fluid pressure within the actuator 116. Of course, an actuator control line 261 may be coupled directly to the actuator 116 without the use of a fitting 246. The bracket 244 is coupled to the actuator 116 and is utilized to couple the actuator 116 to another item within a vehicle, such as a cover plate 113, turbine housing 114, and/or compressor housing 110 of a turbocharger. Therefore, the bracket 244 may be configured in different ways depending on the structure to which the bracket 244 should be coupled and the configuration of the actuator 116.

The actuator 116 may comprise a first casing 242 and a second casing 240, which may be secured to each other utilizing, for example, casing screws 301 or another type of coupling mechanism, such as adhesive, bolts, or welding. The actuating shaft 252 may be axially repositioned in response to pressure within the actuator 116. The actuating shaft 252 may comprise a first set of threads 237 and a second set of threads 239. The actuating shaft 252 may be disposed to extend through the diaphragm washer 282, a flexible diaphragm 280, a first spring guide 268, a lock washer 270, an actuator shaft nut 272, a first spring 262, a second spring 264, a third spring 266, a stopper sleeve 260, a second spring guide 258, a dust seal 256, an opening 263 in the second casing 240 and a jam nut 254.

The actuator shaft nut 272 may engage with the first set of threads 237 to secure the diaphragm washer 282, flexible diaphragm 280, first spring guide 268, and lock washer 270 around the actuating shaft 252. The stopper sleeve 260, second spring guide 258, and dust seal 256 may be disposed around the actuating shaft 252 axially between the actuator shaft nut 272 and the second casing 240. The first spring 262, the second spring 264, and the third spring 266 may be disposed around the actuating shaft 252 (e.g., in a nested configuration, as illustrated in subsequent figures) and axially intermediate the first spring guide 268 and the second spring guide 258. The dust seal 256 is designed to limit the ingress of dust and other debris (e.g., fluids) through the opening 263 into the second casing 240. The jam nut 254 and linkage 250 may engage the second set of threads 239 of the actuating shaft 252. Therefore, the jam nut 254 and linkage 250 may be positioned at different axial locations with respect to the actuating shaft 252 employing the second set of threads 239. Rotating the jam nut 254 and linkage 250 in opposite directions may serve to fix an axial position or location of these items 254, 250 with respect to the actuating shaft 252.

The bracket 244 may be secured to the second casing 240 using bracket screws 302 or another type of coupling mechanism.

The first casing 242, second casing 240, actuating shaft 252, jam nut 254, linkage 250, bracket 244, diaphragm washer 282, first spring guide 268, lock washer 270, actuator shaft nut 272, first spring 262, second spring 264, third spring 266, stopper sleeve 260, second spring guide 258, casing screws 301, and bracket screws 302, may be made, for example, of steel, stainless steel, or another metallic or composite material. In contrast, the flexible diaphragm 280 and dust seal 256 may be made, for example, of an elastomeric material, such as one or more polymers, rubbers and/or mixture of the polymers and rubbers.

The fitting 246 may provide a point of connection for an actuator control line 261 that directs the pressurized in and out of the actuator 116.

The casing screws 301 may provide a compressive force to contain the inner components of the actuator 116 and seal the peripheral portion 284 of the flexible diaphragm 280 between the first casing 242 and second casing 240.

The first casing 242 and second casing 240 may comprise an actuator body that houses internal components of the actuator 116.

The actuating shaft 252 may move axially and may provide a point of connection for the linkage 250.

The diaphragm washer 282 may comprise a washer that distributes the compressive force provided by the actuator shaft nut 272 via the lock washer 270 and first spring guide 268 to ensure that a proper seal is created thereby.

The flexible diaphragm 280 may comprise a peripheral portion 284 and axially movable portion 286 (centrally disposed with respect to the peripheral portion 284) that displaces along an axial direction. The flexible diaphragm 280 serves as a seal containing the pressure of the fluid disposed within the actuator 116.

The first spring guide 268 may comprise a machined component that limits movement of the three springs 262, 264, 266 and distributes the compressive force provided by the actuator shaft nut 272 to ensure a proper seal at an interior edge of the flexible diaphragm 280.

The lock washer 270 may comprise a washer that distributes the compressive force and resists the loosening of the actuator shaft nut 272.

The actuator shaft nut 272 may compress the lock washer 270, first spring guide 268, flexible diaphragm 280, and diaphragm washer 282, which, when acting together, may seal an interior edge of the flexible diaphragm 280.

The first spring 262, second spring 264, and third spring 266 provide staged resistive force in opposition to axial displacement of the actuating shaft 252 away from the first casing 242 in response to fluid pressure within the actuator 116, as will be explained in greater detail below.

The stopper sleeve 260 may set at maximum allowable axial displacement of the actuating shaft 252 and away from the first casing 242.

The second spring guide 258 may comprise a machined component that engages and constrains movement of the first spring 262, second spring 264, and third spring 266. As illustrated, the first spring 262, the second spring 264, and the third spring 266 may comprise helical, compression springs. In other words the springs 262, 264, 266 are helical in shape and, considered as a unit, provide a staged, resistive force that resists axial extension of the actuating shaft 252 away from the first casing 242. In an alternate embodiment, one or more of the springs 262, 264, 266 may comprise a different type of spring (not illustrated in the figures), such as a wave, torsion, spiral, disk or leaf spring.

The dust seal 256 may comprise an annular-shaped component that mitigates the ingress of dust and other debris through the opening 263 in the second casing 240. To some extent, the dust seal 256 may also guide and center movement of the actuating shaft 252 through the opening 263.

As explained above, the bracket 244 may be used to couple the actuator 116 to, for example, the cover plate 113, turbine housing 114, and/or compressor housing 110.

The bracket screws 302 may be used to secure the bracket 244, for example, to the second casing 240.

As noted previously, the jam nut 254 may be tightened against the linkage 250 to fix an axial position of the jam nut 254 and the linkage 250 relative to the actuating shaft 252.

FIGS. 13A-14B

Figure 13B:
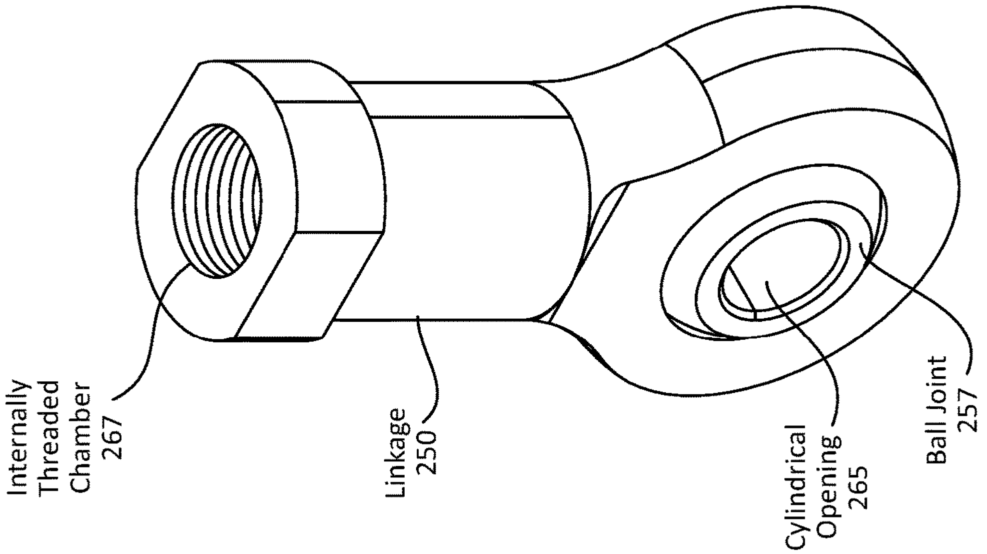
FIG. 13B is a perspective view of one embodiment of the linkage shown in FIG. 13A.
Figure 13A:
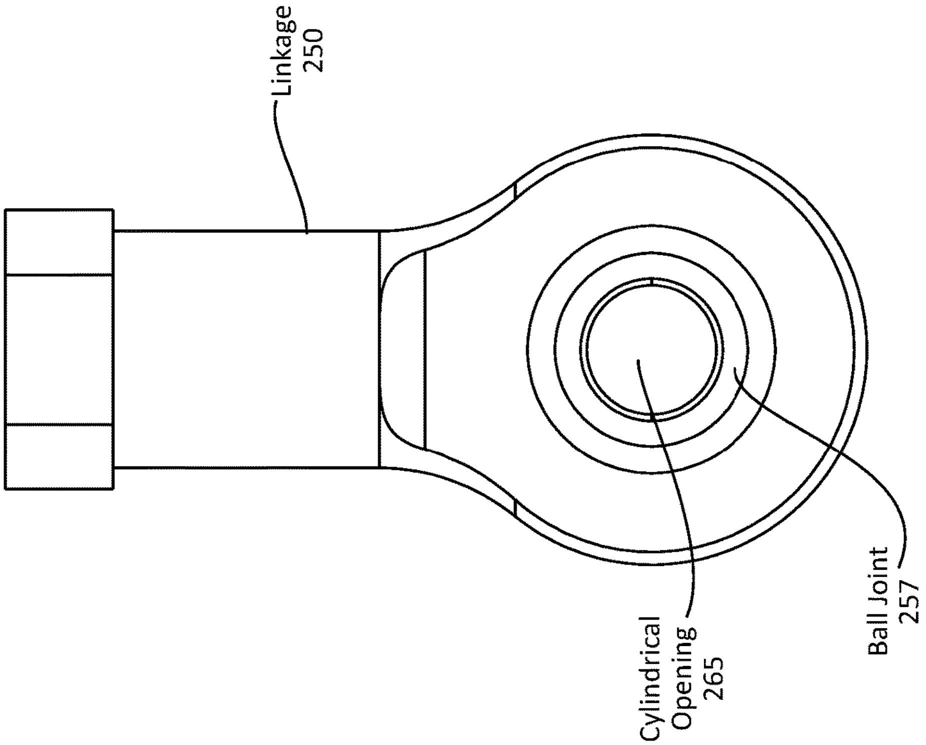
FIG. 13A is a side, elevational view of one embodiment of linkage.

FIGS. 13A-14B illustrate different embodiments of linkage 250, 251. FIGS. 13A-13B illustrate a first embodiment of linkage 250 that includes a ball joint 257 and a cylindrical opening 265 for receiving an actuating arm connector 255 for pivotally connecting the linkage 250 to the actuating arm 253. The linkage 250 also includes an internally threaded chamber 267 for receiving the second set of threads 239 of the actuating shaft 252.

Figure 14B:
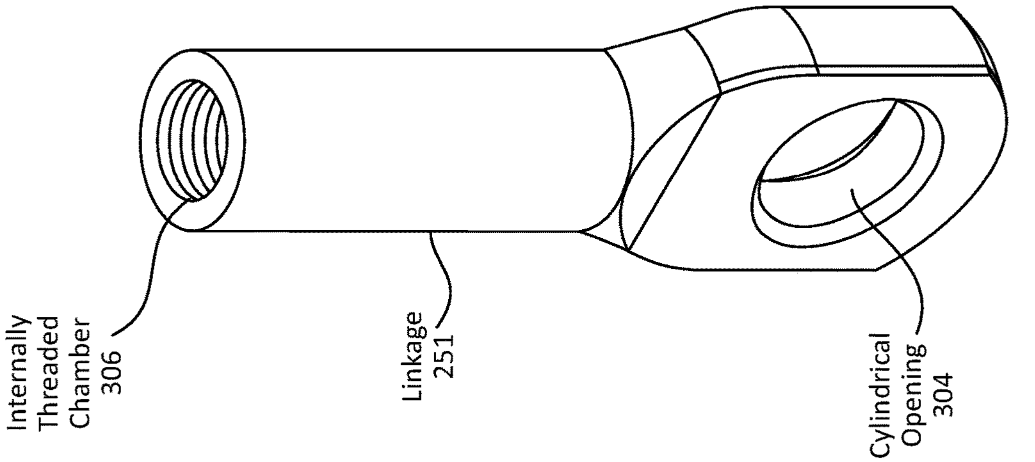
FIG. 14B is a perspective view of the embodiment of the linkage shown in FIG. 14A.
Figure 14A:
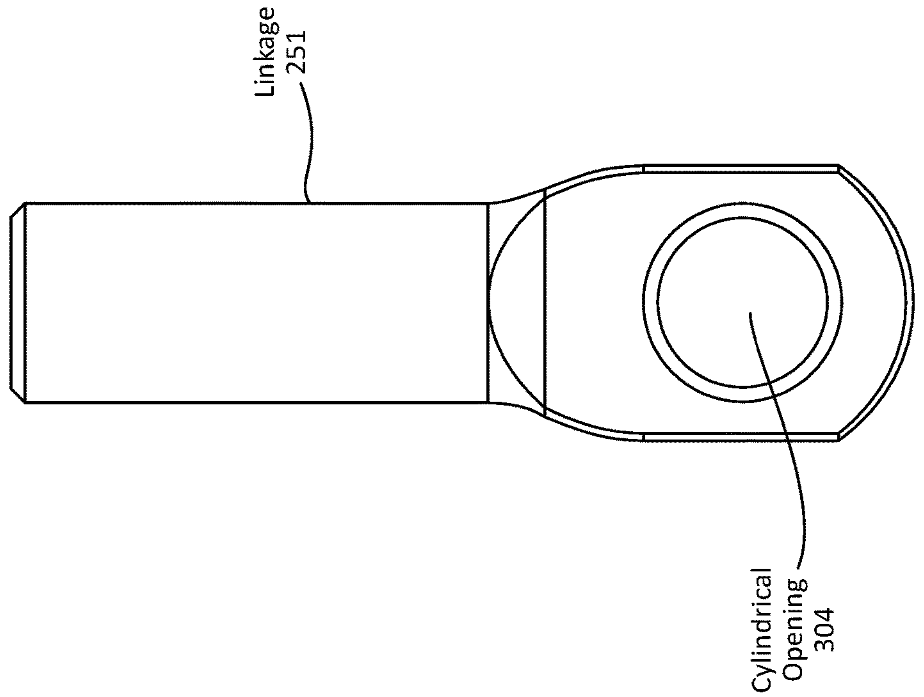
FIG. 14A is a side, elevational view of another embodiment of linkage.

A second embodiment of the linkage 251 is illustrated in FIGS. 14A-14B. The illustrated embodiment is devoid of a ball joint and simply includes a cylindrical opening 304 for receiving a portion of an actuating arm connector 255. The linkage 251 also includes an internally threaded chamber 306 for receiving the second set of threads 239 of the actuating shaft 252.

FIGS. 15A-15B

Figure 15A:
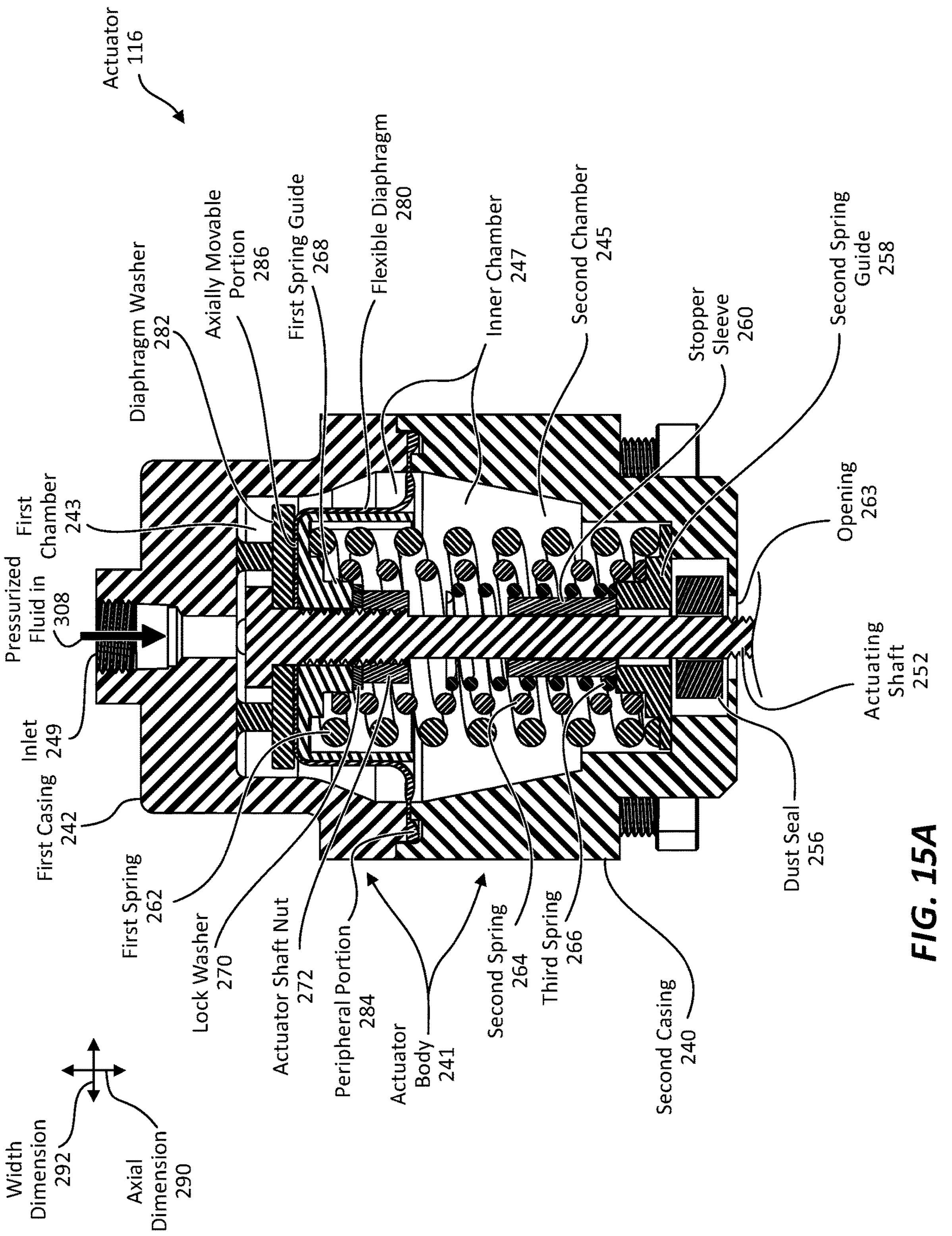
FIG. 15A comprises a side, cross-sectional view of the actuator shown in FIG. 1 with a partial view of an actuating shaft.
Figure 15B:
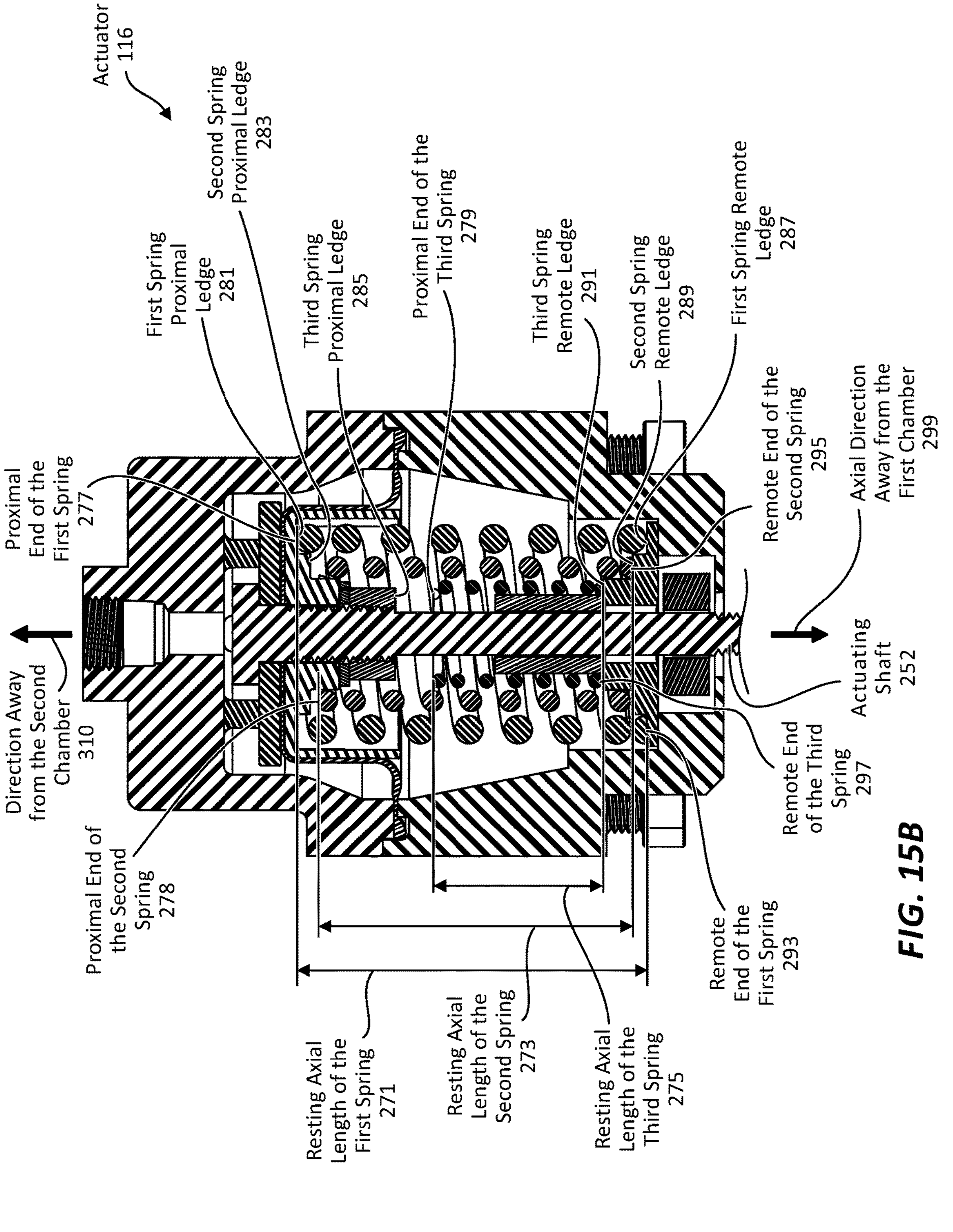
FIG. 15B comprises the same side cross-sectional view of FIG. 15A with different features identified using reference numerals than those identified in FIG. 15A.

FIGS. 15A-15B each provide an identical, partial cross-sectional view of the actuator 116. More specifically, FIGS. 15A-15B are identical views but are reproduced to provide adequate space for the inclusion of the many reference numbers. The actuator 116 includes an axial dimension 290 extending generally from the inlet 249 to the opening 263. The actuator 116 also includes a width dimension 292, which is perpendicular to the axial dimension 290.

The first casing 242 and the second casing 240 jointly comprise an actuator body 241 that houses and protects the internal components of the actuator 116.

The peripheral portion 284 of the flexible diaphragm 280 is secured between the first casing 242 and the second casing 240. The axially movable portion 286 of the flexible diaphragm 280 may move axially within the actuator 116. The actuator body 241 defines an inner chamber 247. The flexible diaphragm 280 divides the inner chamber 247 into a first chamber 243, which is in fluid communication with the inlet 249, and a second chamber 245, which is in fluid communication with the opening 263. As indicated, pressurized fluid 308 may enter the actuator 116 via the inlet 249.

In FIGS. 15A-15B, only a partial view of the actuating shaft 252 is provided. As noted previously, the actuator shaft nut 272 secures the diaphragm washer 282, axially movable portion 286, first spring guide 268, and lock washer 270 to the actuating shaft 252. The stopper sleeve 260, second spring guide 258, and dust seal 256 are secured around the actuating shaft 252 and axially intermediate the actuator shaft nut 272 and the opening 263 in the second casing 240.

The first spring 262, the second spring 264, and the third spring 266 are disposed axially intermediate the first spring guide 268 and the second spring guide 258. The first spring 262 has a resting axial length of the first spring 271. The second spring 264 has a resting axial length of the second spring 273, and the third spring 266 has a resting axial length of the third spring 275. The resting axial length of the second spring 273 and the resting axial length of the third spring 275 represent the axial length of these springs when the springs are uninfluenced by external forces. The resting axial length of the first spring 271 is slightly different and represents the axial length of the first spring 262 when the actuator 116 is in a resting state, uninfluenced by external forces, with the diaphragm washer 282 in the fully retracted position, optionally with the diaphragm washer 282 in contact with a surface of the inner chamber 247. As illustrated in these figures, the second spring guide 258 limits axial movement of the first spring 262, second spring 264 and third spring 266 in an axial direction away from the first chamber 299. The first spring guide 268 and/or the actuator shaft nut 272 limit axial movement of the first spring 262, second spring 264, and third spring 266 in a direction away from the second chamber 310.

As illustrated in these figures, a proximal end of the first spring 277 may be in contact with or limited in axial movement by a first spring proximal ledge 281 of the first spring guide 268 and a remote end of the first spring 293 may be in contact with or limited in axial movement by a first spring remote ledge 287 of the second spring guide 258. A proximal end of the second spring 278 may be in contact with or limited in axial movement by a second spring proximal ledge 283 of the first spring guide 268 and a remote end of the second spring 295 may be in contact with or limited in axial movement by a second spring remote ledge 289 of the second spring guide 258. A proximal end of the third spring 279 may be in contact with or limited in axial movement by a third spring proximal ledge 285 of the actuator shaft nut 272 and a remote end of the third spring 297 may be in contact with or limited in axial movement by a third spring remote ledge 291 of the second spring guide 258. Alternatively, the third spring proximal ledge 285 may comprise a portion of the first spring guide 268.

As illustrated in FIGS. 15A-15B, the first spring proximal ledge 281, the second spring proximal ledge 283, and the third spring proximal ledge 285 may be at different axial positions. Also, the third spring remote ledge 291, the second spring remote ledge 289, and the first spring remote ledge 287 may be at different axial positions. In alternative embodiments (not illustrated), one or more of the proximal ledges 281, 283, 285 may be at the same axial position, and one or more of the remote ledges 287, 289, 291 may be at the same axial position. Such embodiments may create stages of resistance to axial movement of the axially movable portion 286, for example, through springs 262, 264, 266 of different resting axial lengths.

As illustrated in these figures, the first spring 262, second spring 264, and third spring 266 may be in a nested configuration. More specifically, as illustrated, at least a portion of the third spring is disposed radially inward with respect to at least a portion of the second spring 264 and with respect to at least a portion of the first spring 262. Also, at least a portion of the second spring 264 is disposed radially inward with respect to at least a portion of the first spring 262.

The actuating shaft 252 is slidably positioned within the opening 263 such that axial movement of the axially movable portion 286 causes a corresponding axial movement of the coupled actuating shaft 252.

FIGS. 16-20

Figure 16:
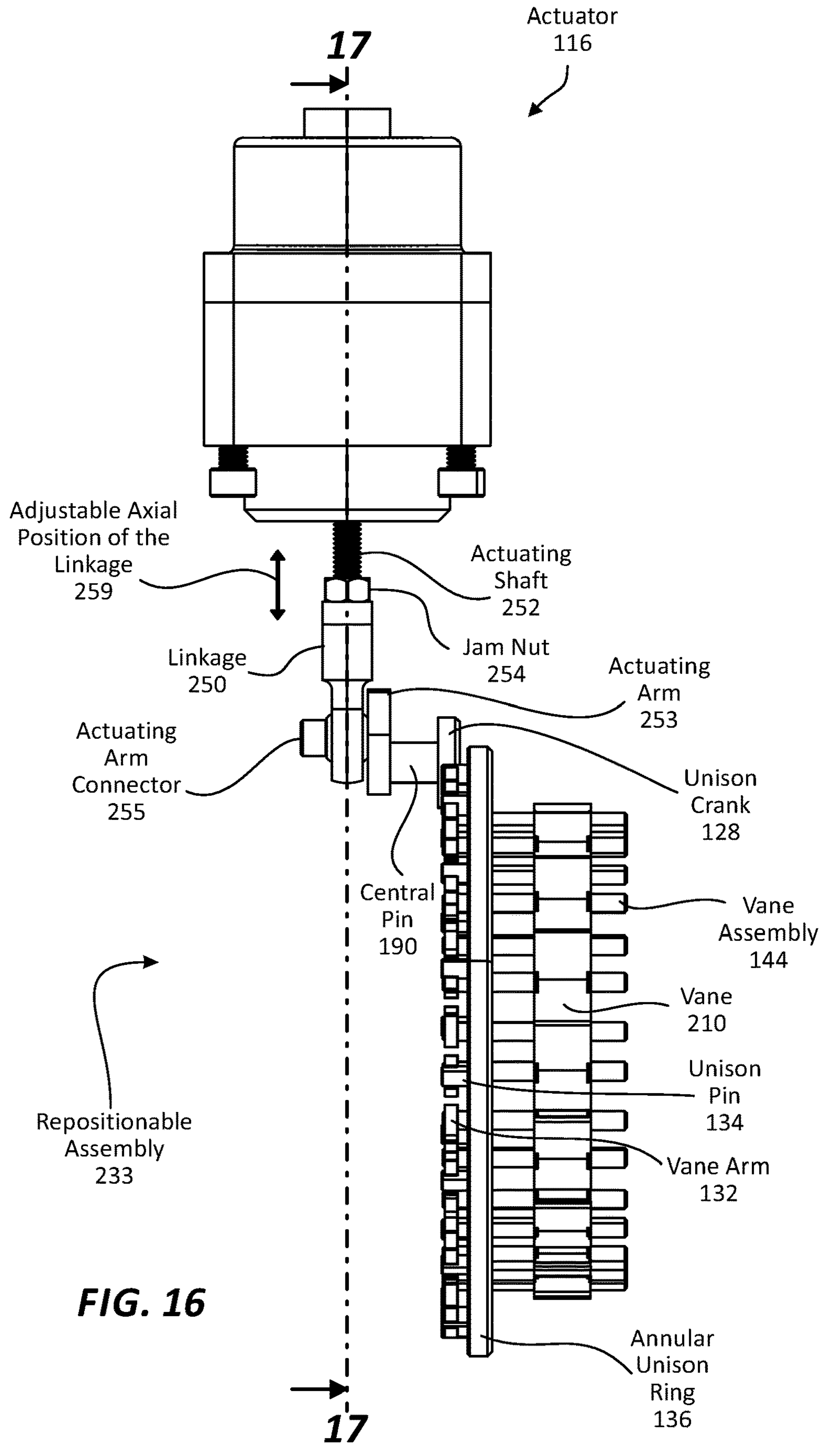
FIG. 16 is a side elevational view of a portion of the multi-stage actuator with the fitting removed, and the linkage shown in FIG. 1 in a working arrangement with a side, elevational view of a repositionable assembly of a turbocharger, the repositionable assembly comprising an annular unison ring, a unison crank, and a number of vane arms, unison pins, and vane assemblies.

The identified figures, which will be discussed collectively, serve to illustrate the staged resistive force provided by the three springs 262, 264, 266 to axial displacement of the actuating shaft 252. FIG. 16 provides a side view of the actuator 116, the jam nut 254, linkage 250, actuating arm connector 255, central pin 190, and a repositionable assembly 233 of a turbocharger 100. As noted above, the repositionable assembly 233 comprises an annular unison ring 136, a unison crank 128, and a number of unison pins 134, vane arms 132, and vane assemblies 144 (each of which includes a vane 210).

Figure 17:
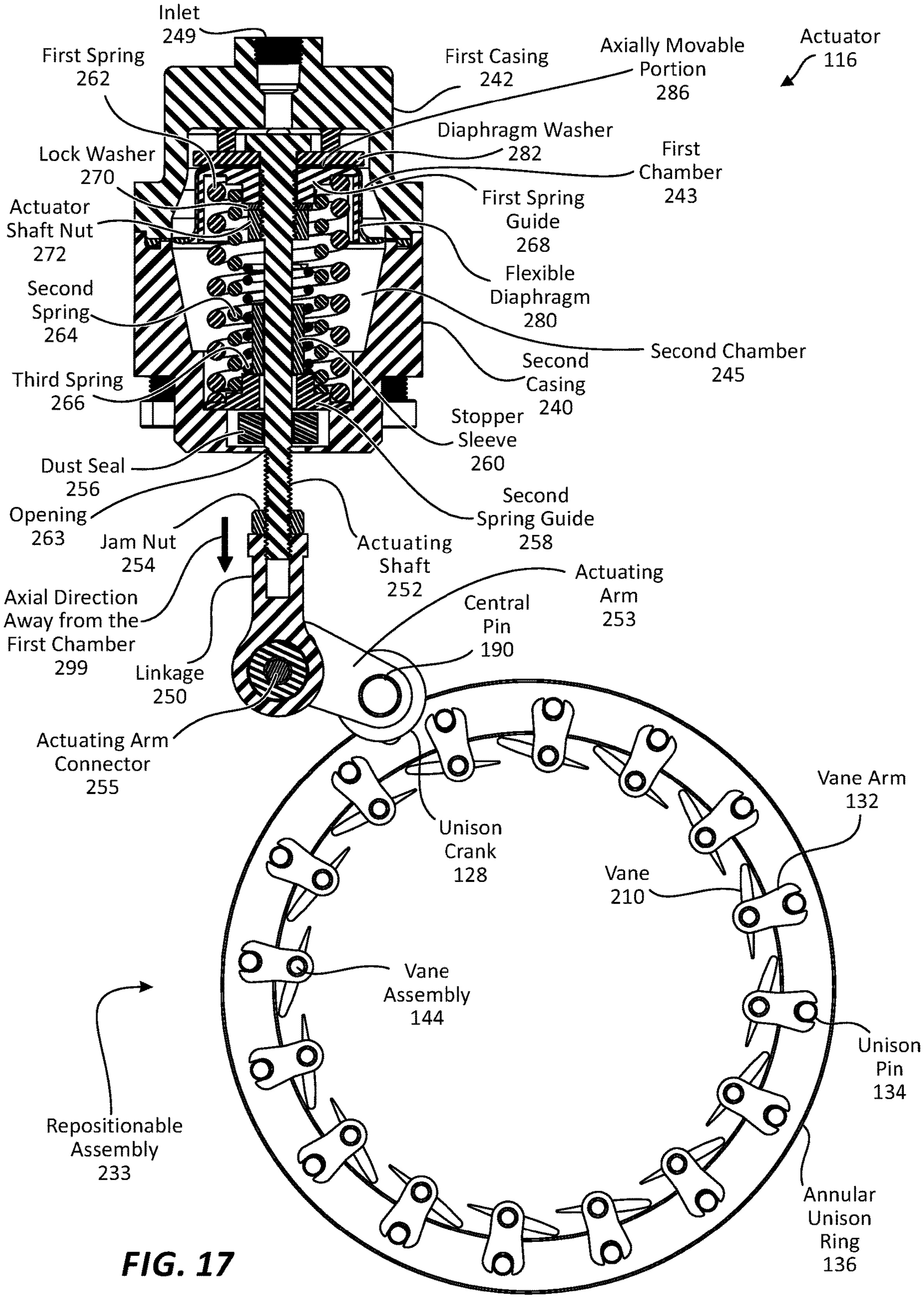
FIG. 17 is a side, cross-sectional view of the portion of the multi-stage actuator shown in FIG. 15 and a top view of the repositionable assembly shown in a resting position taken across the line 17-17 shown in FIG. 16.
Figure 18:
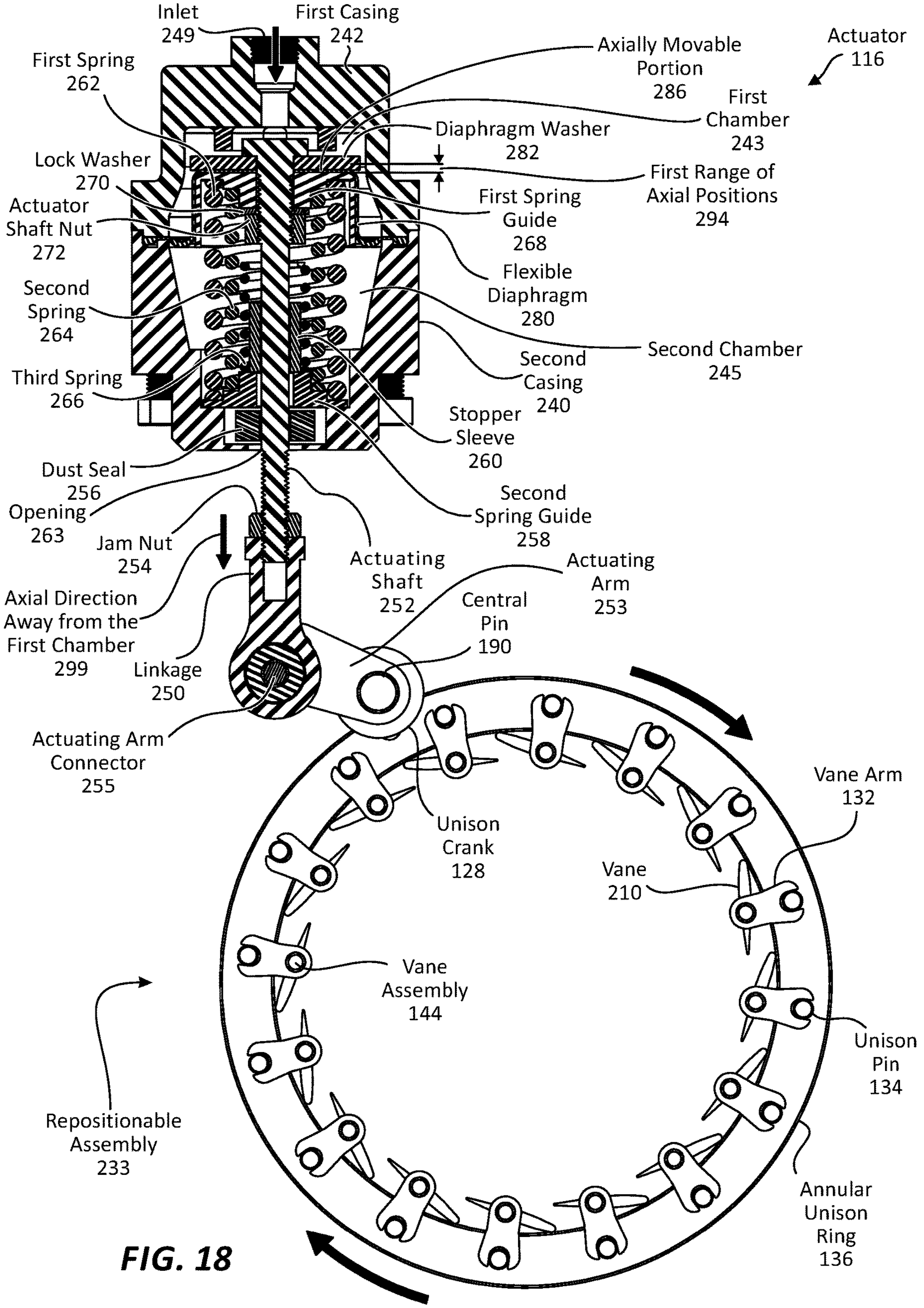
FIG. 18 is similar to the view of FIG. 17 except that the multi-stage actuator and repositionable assembly are shown in the first stage (only engaging the first spring)
Figure 19:
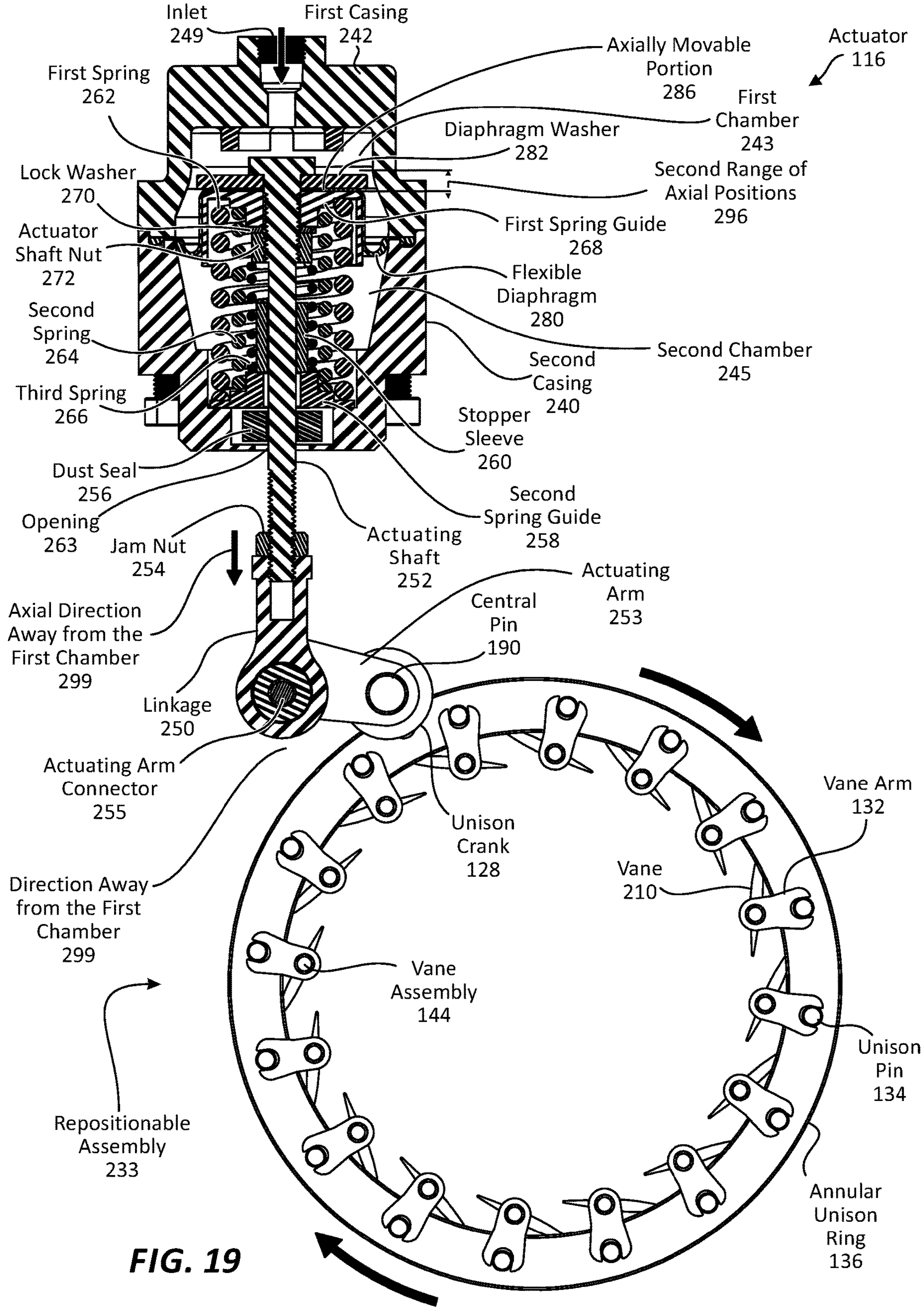
FIG. 19 is similar to the view of FIG. 17 except that the multi-stage actuator and repositionable assembly are shown in the second stage (engaging only the first and second springs)
Figure 20:
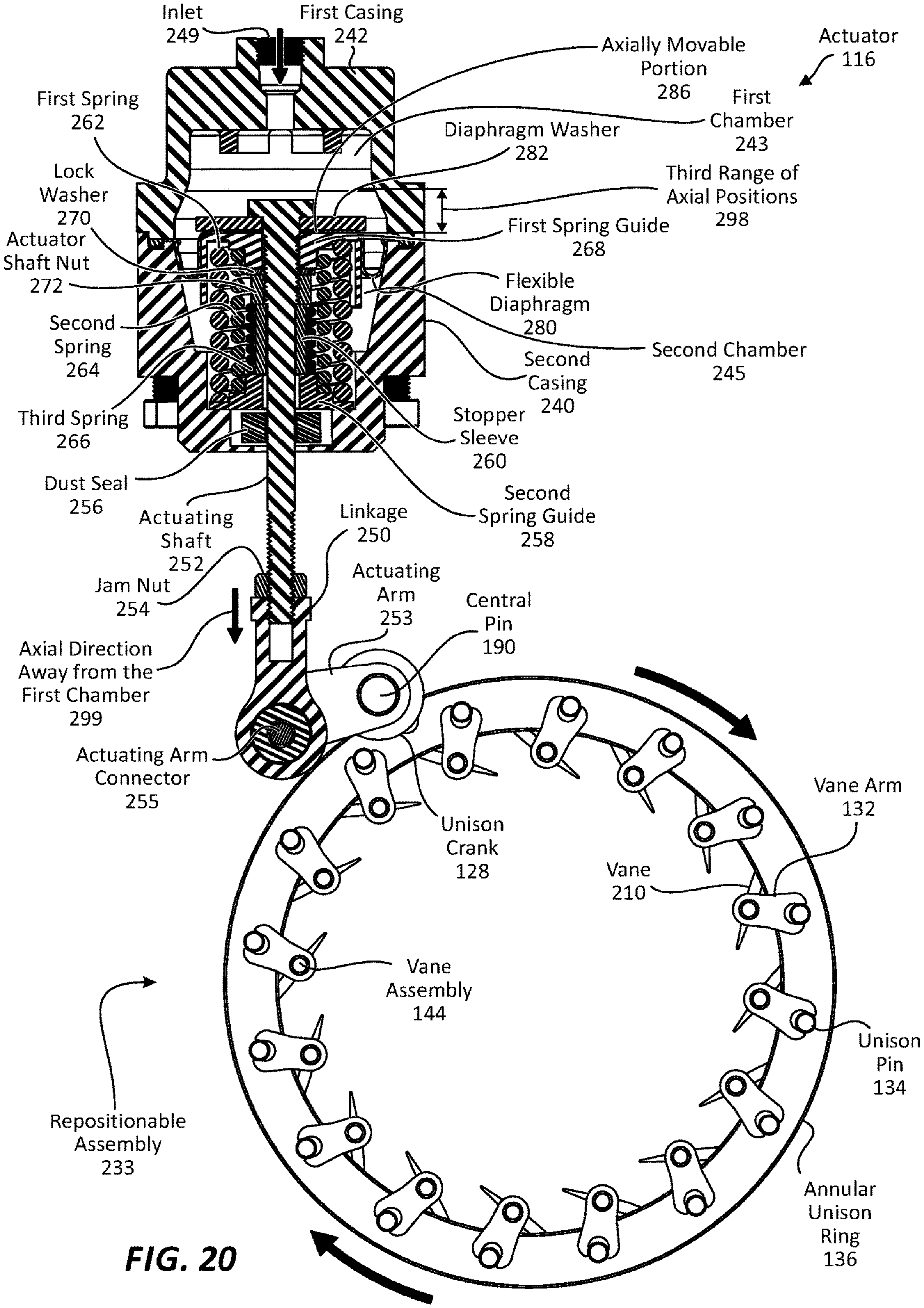
FIG. 20 is similar to the view of FIG. 17 except that the multi-stage actuator and repositionable assembly are shown in the third stage (engaging the first, second and third springs)

FIG. 17-20 illustrate the actuator 116 in different states, such as when the actuator 116 is in a resting state with the actuating shaft 252 fully retracted (as illustrated in FIG. 17), when only the first spring 262 provides resistance to axial movement (axial extension) of the actuating shaft 252 (as illustrated in FIG. 18), when only the first spring 262 and the second spring 264 provide resistance to axial movement (axial extension) as illustrated in FIG. 19), and when each of the three springs 262, 264, 266 provide resistance to axial movement of the actuating shaft 252 (FIG. 20). It also should also be noted that FIG. 20 illustrates the maximal extension of the actuating shaft 252.

FIG. 16-20 also illustrate various components of the actuator 116. The actuator may comprise an inlet 249, a first casing 242, a second casing 240, a flexible diaphragm 280 dividing a first chamber 243 from a second chamber 245, and actuating shaft 252 slidably disposed within an opening 263 in the second casing 240. The actuating shaft 252 may be disposed to extend through the diaphragm washer 282, the flexible diaphragm 280, the first spring guide 268, a lock washer 270, an actuator shaft nut 272, a first spring 262, a second spring 264, a third spring 266, a stopper sleeve 260, a second spring guide 258, a dust seal 256, the opening 263 and a jam nut 254.

Referring specifically to FIG. 17, the actuator 116 is presented in a resting state. In the state, the pressure level of the fluid within the first chamber 243 is insufficient to displace the axially movable portion 286 of the flexible diaphragm 280 from its default or fully retracted position, i.e., the pressure level in the fluid is insufficient to displace the axially movable portion 286 in an axial direction away from the first chamber 299. As illustrated, only the first spring 262 may provide resistance to axial displacement of the axially movable portion.

The actuating shaft 252, jam nut 254, and linkage 250 are in a fully retracted position. Please note the angle of the actuating arm 253 and the corresponding angle of the vane 210 of each vane assembly 144.

Referring now to FIG. 18, the fluid pressure within the first chamber 243 is sufficient to displace the axially movable portion 286 of the flexible diaphragm 280 in an axial direction away from the first chamber 299, such that the actuating shaft 252, jam nut 254, and linkage are extended from their fully retracted position into a first stage position. In the first stage, the first spring 262 is positioned within the second chamber 245 such that only the first spring 262 engages with and resists movement of the axially movable portion 286 within a first range of axial positions 294 of the axially movable portion 286. Please note that the engagement between the first spring 262 and the axially movable portion 286 is indirect, i.e., via the first spring guide 268.

In the first stage, the angle of the actuating arm 253 is altered, which causes the annular unison ring 136 to rotate, which, in turn, alters the angle of the vane 210 of each vane assembly 144 to a more open position, thereby allowing more exhaust or air to impinge on the turbine wheel 154, which, in turn, causes the turbine shaft 146 and compressor wheel 124 to rotate at a different rate. The change in rotation of the compressor wheel 124 changes air flow through the associated engine (e.g., introducing a greater quantity of compressed air into the piston chamber), which yields an increase in power to the engine. In certain embodiments, the resting state, illustrated in FIG. 17, may also be considered a portion of the first stage, i.e., when only the first spring 262 limits or resists axial movement of the axially movable portion 286.

Referring now to FIG. 19, the fluid pressure within the first chamber 243 is sufficient to further displace the axially movable portion 286 of the flexible diaphragm 280 in an axial direction away from the first chamber 299, such that the actuating shaft 252, jam nut 254, and linkage are further extended from their first stage position into a second stage position. In the second stage, the first spring 262 and the second spring 264 are positioned within the second chamber 245 such that both the first spring 262 and second spring 264 engage with and resist movement of the axially movable portion 286 within a second range of axial positions 296 of the axially movable portion 286. Again, please note that the engagement between the first spring 262 and second spring 264 and the axially movable portion 286 is indirect, i.e., via the first spring guide 268.

In the second stage, the angle of the actuating arm 253 is altered, which causes the annular unison ring 136 to further rotate, which, in turn, further alters the angle of the vane 210 of each vane assembly 144 to a more open position, thereby allowing more exhaust or air to impinge on the turbine wheel 154. This changes air flow through the associated engine (e.g., introducing greater quantity of compressed air into the piston chamber), which yields an increase in power of the engine.

Referring now to FIG. 20, the fluid pressure within the first chamber 243 is sufficient to further displace the axially movable portion 286 of the flexible diaphragm 280 in an axial direction away from the first chamber 299, such that the actuating shaft 252, jam nut 254, and linkage are further extended from their second stage position into a third stage position. In the third stage, the first spring 262, the second spring 264 and the third spring 266 are positioned within the second chamber 245 such that each of the first spring 262, second spring 264 and third spring 266 engage with and resist movement of the axially movable portion 286 within a third range of axial positions 298 of the axially movable portion 286. Again, please note that the engagement between the first spring 262, second spring 264, and third spring and the axially movable portion 286 is indirect, i.e., via the first spring guide 268 and/or actuator shaft nut 272.

In the third stage, the angle of the actuating arm 253 is further altered, which causes the annular unison ring 136 to further rotate, which, in turn, further alters the angle of the vane 210 of each vane assembly 144 to a more open position, thereby allowing more exhaust or air to impinge on the turbine wheel 154, which, in turn, changes air flow through the associated engine (e.g., introducing a greater quantity of compressed air into the piston chamber), which yields an increase in power to the engine.

FIG. 20 also illustrates the maximum displacement of the axially movable portion 286 and the actuating shaft 252 because the actuator shaft nut 272 is in contact with the stopper sleeve 260, which prevents further axial displacement.

In various embodiments, and as illustrated in the figures, each of the first range of axial positions 294, the second range of axial positions 296, and the third range of axial positions are non-overlapping along the axial dimension 290.

FIG. 21

Figure 21:
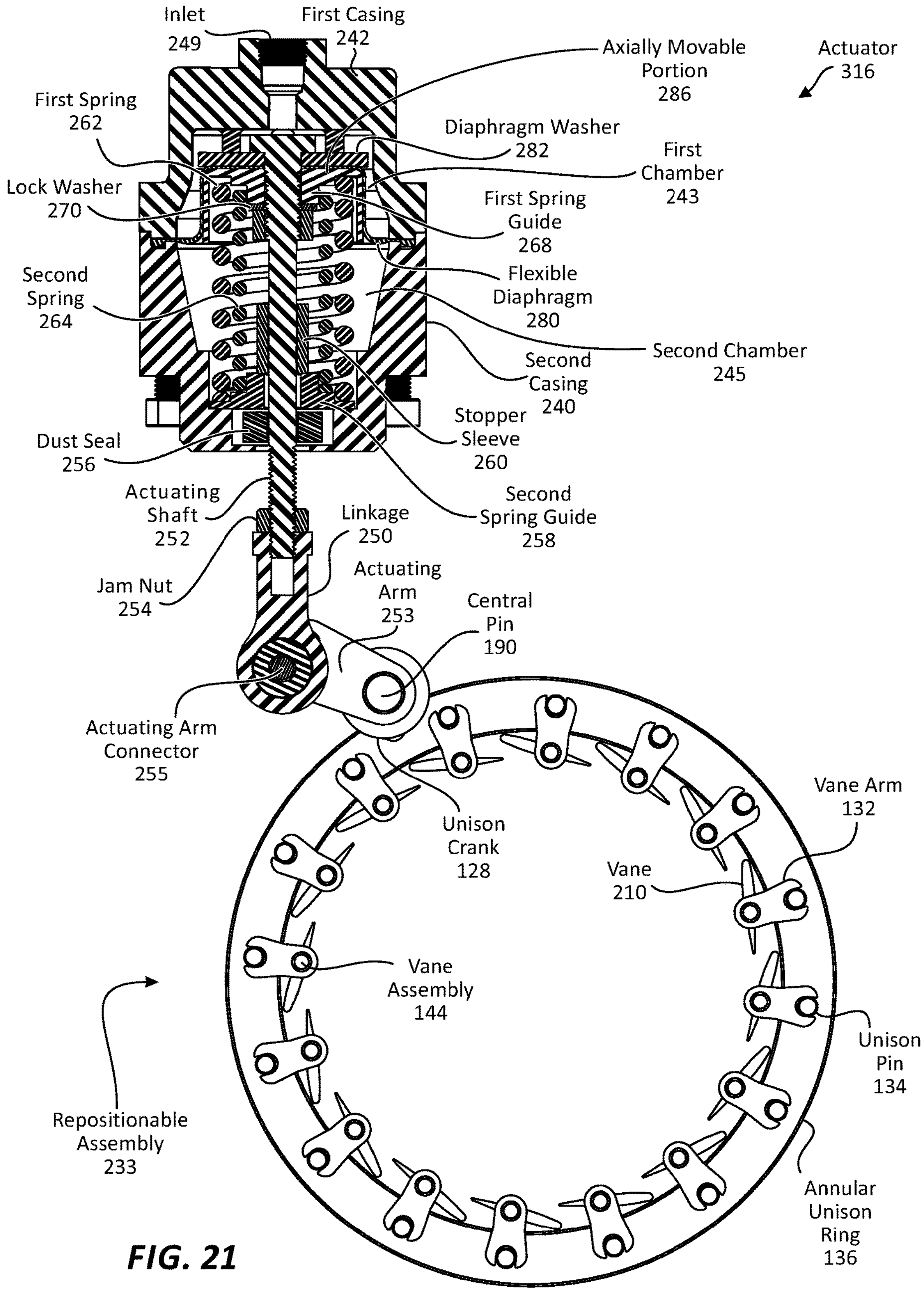
FIG. 21 is similar to the view of FIG. 17 except that only a first and second spring are included in the illustrated embodiment (i.e.

FIG. 21 illustrates an alternative embodiment of the actuator 316. This embodiment of the actuator 316 is similar to the previously described embodiment of the actuator 116 except that only a first spring 262 and a second spring 264 are incorporated into this embodiment of the actuator 316. Therefore, only the first spring 262 and the second spring 264 are disposed within the second chamber 245. This embodiment of the actuator 316 is illustrated in FIG. 21 in a resting state, in which the pressure in the first chamber 243 is insufficient to displace the axially movable portion 286 in an axial direction away from the first chamber 299. The operation of this embodiment of the actuator 316 is similar to the operation of the earlier described embodiment of the actuator 116 in FIGS. 17-19. In other words, only the first and stages described in those figures take place in this embodiment of the actuator 316, while there is no third stage.

FIG. 22

Figure 22:
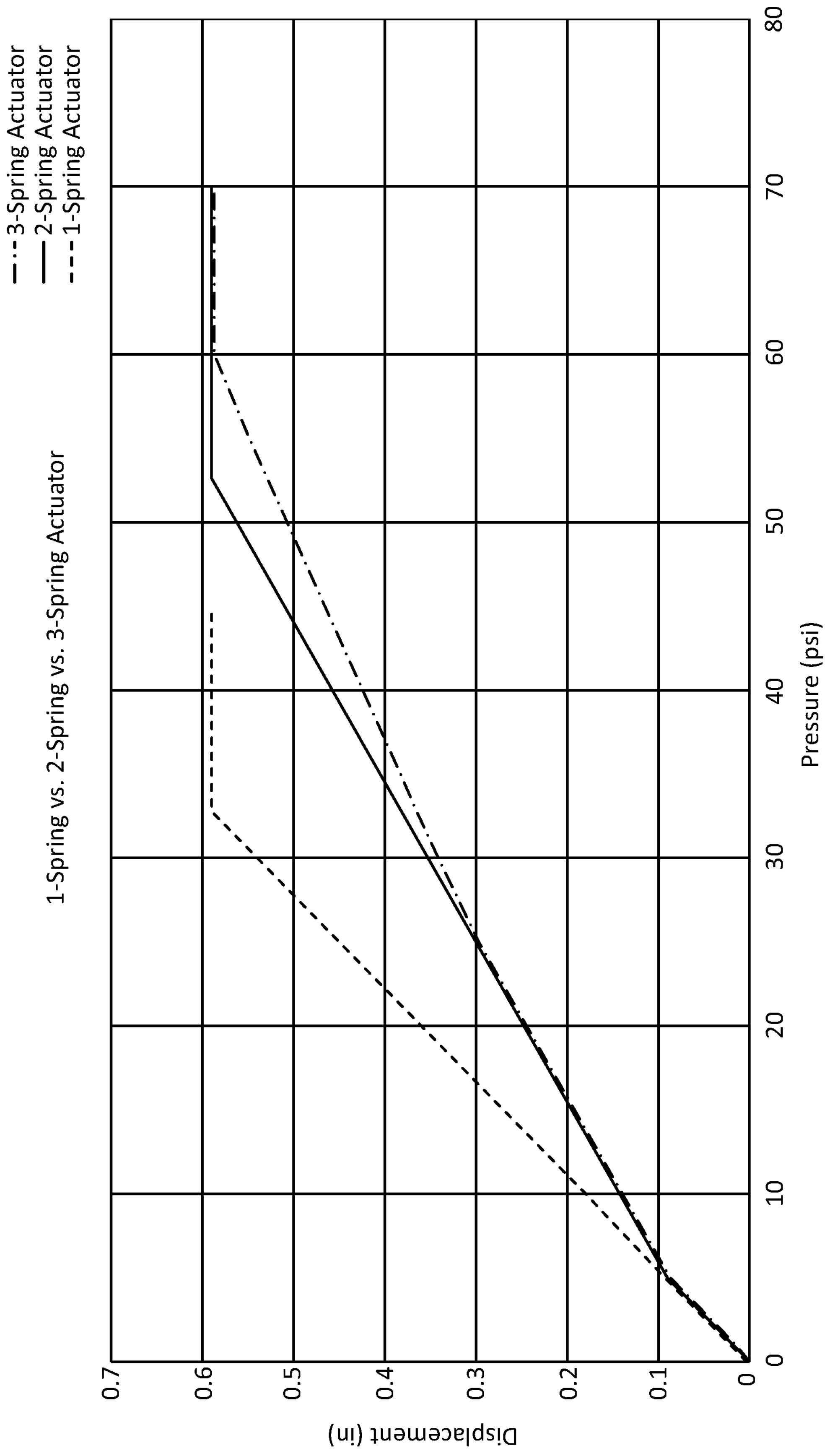
FIG. 22 is a graphical representation of the displacement in inches of various embodiments of actuators at various pressures represented in pounds per square inch (psi).

FIG. 22 is a chart illustrating a relationship between the displacement of an actuating shaft 252 (which equals the same displacement of the axially movable portion 286) in inches and the fluid pressure level, in pounds per square inch (psi) when only one spring is utilized (a 1-spring actuator), when only two springs are utilized (a 2-spring actuator) and when only three springs are utilized (a 3-spring actuator). As illustrated, the displacement that takes place is less utilizing a 2-spring actuator and/or 3-spring actuator when compared to utilizing a 1-spring actuator. For example, when the pressure in the first chamber 243 is 40 psi, the axial displacement of the 1-spring actuator is nearly 0.6 inches, while the axial displacement of the 2-spring actuator is approximately 0.45 inches and the displacement of the 3-spring actuator is approximately 0.425 inches. Therefore, a multi-stage actuator (a 2-spring actuator, a 3-spring actuator, or an actuator having more than three springs), opens the space between the vanes 210 more gradually (i.e., in a nonlinear manner, approximating a slight curve, which coincides with how turbochargers tend to operate with respect to an associated engine, thus increasing the performance characteristics of the turbocharger and associated engine).

CONCLUSION

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims, if any, present elements of the various steps in a sample order and are not meant to be limited to the specific order or hierarchy presented.

Various components disclosed herein may be made, for example, of stainless steel, ductile iron, cast-iron, or plain steel.

It should be noted that the components illustrated in the figures are merely examples of the claimed subject matter. For example, the shape of the turbine housing 114 and compressor housing 110, 110*a* may be varied within the scope of the disclosed and claimed subject matter. Additionally, the configuration of the vane assemblies 144 may also be varied within the scope of the disclosed and claimed subject matter. For example, the first and second wings 212, 214 of one or more vanes 210 may be of different non-symmetrical sizes or shapes. A guide pin 119, 149 may comprise, for example, a dowel or roll pin. As used herein, a "turbocharger component" comprises any subpart or set of subparts of a turbocharger, such as the portion of the turbocharger 100 illustrated in FIG. 4A or any other subpart of the turbocharger 100, 100*a*. In addition, various portions of the design may be integrally formed or separately formed. For example, in various embodiments, the second nozzle ring 152 may be integrally formed with the turbine housing 114 or, alternatively, may be rotatably disposed within the second annular groove 170. Securing the first casing 242 to the second casing 240 can also be done through other mechanisms known in the art, such as v-band clamps or stamped manufacturing processes, which couples the two casings together. It should also be noted that many of the parts illustrated in the figures may be integrally formed with other parts or may be secured together using mechanisms or methods other than those indicated in the figures and description, such as welding, adhesives, and/or stamping processes.

Also, 2-spring and 3-spring actuators are illustrated in the figures, but more than three springs may also be incorporated into a particular design. Those skilled in the art will appreciate that the particular structure shown in the figures is only illustrative. By way of example only, the bracket 244 may be configured in a number of different ways. Also, different types of springs may be utilized rather than merely helical, compression springs, as illustrated in the figures. Also, for example, the actuating shaft 252 and linkage 250, 251 could be integrally formed. Also, the first and second spring guides 268, 258 could be formed in different ways to retain and engage with the springs in the design.

In addition, the illustrated first range of axial positions 294, the second range of axial positions 296, and the third range of axial positions 298 are merely illustrative. The precise position and axial dimension of each of these ranges 294, 296, 298 shown in the figures is merely illustrative and may vary depending on the axial dimension of the various components at play, including the axial dimension of the diaphragm washer 282, axially movable portion 286, first spring guide 268, lock washer 270, actuator shaft nut 272, actuating shaft 252, springs 262, 264, 266, stopper sleeve 260, second spring guide 258 and dust seal 256. In addition, for example, in various embodiments, the dust seal 256 may be omitted, if the operating environment is relatively free of dust, or may be replaced with a dust seal 256 disposed outside of the inner chamber 247. Those skilled in the art will also appreciate that not every component, part and feature shown in the figures or discussed in the description is necessary to achieve a multi-stage operation of the actuator. Therefore, the structure and procedures described in the figures and specification are merely illustrative.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

The invention claimed is:

1. An actuator for a turbocharger comprising:

an actuator body defining an inner chamber, the actuator body comprising an axial dimension, a width dimension, a first casing and a second casing;

a diaphragm comprising an axially movable portion and a peripheral portion, the peripheral portion being secured between the first casing and the second casing, the diaphragm dividing the inner chamber into a first chamber and a second chamber; and an actuating shaft coupled to the axially movable portion such that axial movement of the axially movable portion causes axial movement of the actuating shaft;

an inlet in fluid communication with the first chamber;

a first spring and a second spring disposed within the second chamber, wherein the first spring is positioned within the second chamber such that only the first spring engages with and resists movement of the axially movable portion within a first range of axial positions of the axially movable portion, wherein the second spring is positioned within the second chamber such that both the first spring and the second spring engage with and resist movement of the axially movable portion within a second range of axial positions of the axially movable portion, and wherein the actuating shaft extends through the second chamber and through an opening in the second chamber outwardly away from the second chamber.

2. The actuator of claim 1, further comprising a third spring positioned within the second chamber, wherein the third spring is positioned within the second chamber such that each of the first spring, the second spring, and the third spring engage with and resist movement of the axially movable portion within a third range of axial positions of the axially movable portion.

3. The actuator of claim 2, further comprising a first spring remote ledge for limiting axial movement of a remote end of the first spring in an axial direction away from the first chamber, a second spring remote ledge for limiting axial movement of a remote end of the second spring in the axial direction away from the first chamber, and a third spring remote ledge for limiting axial movement of a remote end of the third spring in the axial direction away from the first chamber, wherein an axial position of the first spring remote ledge is different than an axial position of the second spring remote ledge and an axial position of the third spring remote ledge, and wherein the axial position of the second spring remote ledge is different than the axial position of the third spring remote ledge.

4. The actuator of claim 3, wherein a resting axial length of the first spring is different than a resting axial length of the second spring and a resting axial length of the third spring, and wherein the resting axial length of the second spring is different than the resting axial length of the third spring.

5. The actuator of claim 4, wherein at least a portion of the third spring is disposed radially inward of at least a portion of the first spring and at least a portion of the second spring, and wherein at least a portion of the second spring is disposed radially inward of at least a portion of the first spring.

6. The actuator of claim 5, further comprising linkage coupled to the actuating shaft, wherein an axial position of the linkage relative to the actuating shaft is adjustable.

7. The actuator of claim 5, wherein an axial position of the axial movable portion is altered in response to changes in fluid pressure within the first chamber.

8. The actuator of claim 7, wherein the first, second, and third springs cause decreased movement of the actuating shaft in the axial direction away from the first chamber in response to at least one fluid pressure level within the first chamber when compared to movement of the actuating shaft in the axial direction away from the first chamber in response to the at least one fluid pressure level in the first chamber if the actuator were devoid of the second and third springs.

9. The actuator of claim 8, wherein each of the first, second and third springs are helical, compression springs.

10. The actuator of claim 9, further comprising a stopper sleeve disposed around the actuating shaft to limit axial movement of the actuating shaft in the axial direction away from the first chamber, the stopper sleeve being disposed within the second chamber.

11. The actuator of claim 10, further comprising linkage coupled to the actuating shaft, the linkage being pivotally coupled to an actuating arm, the actuating arm being coupled to a unison crank such that axial movement of the actuating shaft and the linkage causes rotational movement of the unison crank.

12. The actuator of claim 11, further comprising an annular unison ring and a plurality of vane assemblies, wherein the unison crank is pivotally coupled to the annular unison ring such that rotation of the unison crank causes rotational movement of the annular unison ring, wherein the annular unison ring is coupled to the plurality of vane assemblies such that the rotational movement of the annular unison ring causes rotation of each of the plurality of vane assemblies.

13. An actuator for a turbocharger comprising:

an actuator body defining an inner chamber, the actuator body comprising an axial dimension, a width dimension, a first casing and a second casing;

a diaphragm comprising an axially movable portion and a peripheral portion, the peripheral portion being secured between the first casing and the second casing, the diaphragm dividing the inner chamber into a first chamber and a second chamber;

an actuating shaft coupled to the axially movable portion such that axial movement of the axially movable portion causes axial movement of the actuating shaft, the actuating shaft being slidably positioned within an opening in the actuator body; and an inlet in fluid communication with the first chamber;

a first spring and a second spring disposed within the second chamber;

a first spring remote ledge for limiting axial movement of a remote end of the first spring in an axial direction away from the first chamber;

a second spring remote ledge for limiting axial movement of a remote end of the second spring in the axial direction away from the first chamber, wherein the first spring is positioned within the second chamber such that only the first spring engages with and resists movement of the axially movable portion within a first range of axial positions of the axially movable portion, wherein the second spring is positioned within the second chamber such that both the first spring and the second spring engage with and resist movement of the axially movable portion within a second range of axial positions of the axially movable portion, and wherein an axial position of the first spring remote ledge is different than an axial position of the second spring remote ledge.

14. The actuator of claim 13, further comprising a third spring positioned within the second chamber, wherein the third spring is positioned within the second chamber such that each of the first spring, the second spring, and the third spring engage with and resist movement of the axially movable portion within a third range of axial positions of the axially movable portion.

15. The actuator of claim 14, further comprising a third spring remote ledge for limiting axial movement of a remote end of the third spring in the axial direction away from the first chamber, wherein the axial position of the first spring remote ledge is different than an axial position of the third spring remote ledge, and wherein the axial position of the second spring remote ledge is different than the axial position of the third spring remote ledge.

16. The actuator of claim 15, wherein a resting axial length of the first spring is different than a resting axial length of the second spring and a resting axial length of the third spring, and wherein the resting axial length of the second spring is different than the resting axial length of the third spring.

17. The actuator of claim 16, wherein at least a portion of the third spring is disposed radially inward of at least a portion of the first spring and at least a portion of the second spring, and wherein at least a portion of the second spring is disposed radially inward of at least a portion of the first spring.

18. The actuator of claim 17, further comprising linkage coupled to the actuating shaft, wherein an axial position of the linkage relative to the actuating shaft is adjustable.

19. The actuator of claim 17, wherein an axial position of the axial movable portion is altered in response to changes in fluid pressure within the first chamber.

20. The actuator of claim 19, wherein the first, second, and third springs decrease axial movement of the actuating shaft in the axial direction away from the first chamber in response to at least one fluid pressure level within the first chamber when compared to axial movement of the actuating shaft in the axial direction away from the first chamber in response to the at least one fluid pressure level in the first chamber if the actuator were devoid of the second and third springs.

* * * * *